Figure 1:
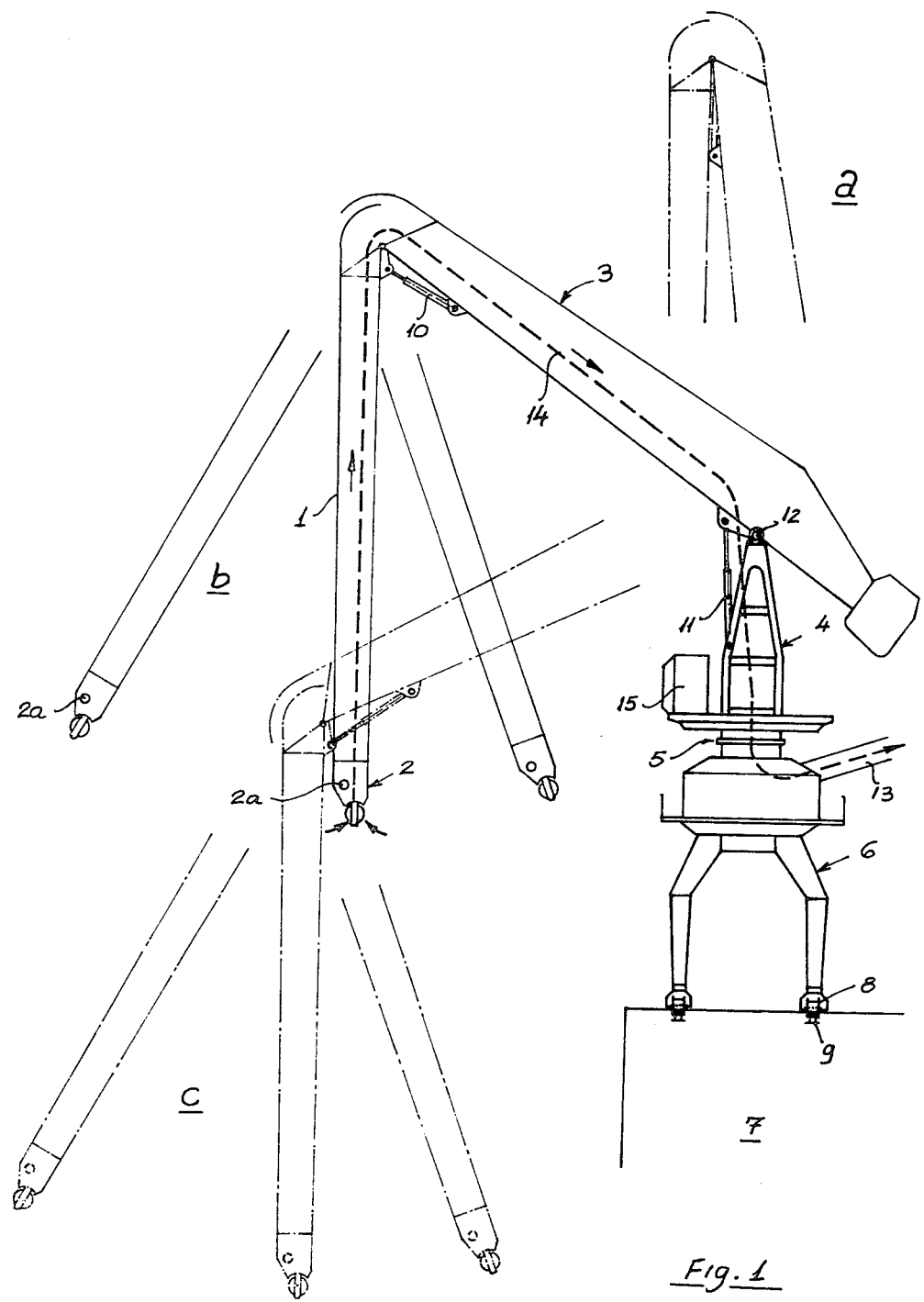

United States Patent [19]

Beresinsky

[11] 4,230,221
[45] Oct. 28, 1980

[54] ELEVATOR-CONVEYOR FOR BULK MATERIAL

[75] Inventor: Isaac Beresinsky, Haifa, Israel

[73] Assignee: Moledeth Development Co., Ltd., Haifa, Israel

[21] Appl. No.: 806,962

[22] Filed: Jun. 15, 1977

[30] Foreign Application Priority Data

Jun. 17, 1976 [IL] Israel .................................... 49821

[51] Int. Cl.² ............................................ B65G 15/14
[52] U.S. Cl. .................................. 198/513; 198/518; 198/626
[58] Field of Search ............... 198/510, 511, 512, 513, 198/518, 604, 605, 626, 627, 628; 214/14, 15 D, 15 E; 414/139, 144, 145

[56] References Cited

U.S. PATENT DOCUMENTS

| | | | |
|---|---|---|---|
| 621,237 | 3/1899 | Fisher | 198/604 |
| 774,331 | 11/1904 | Morley et al. | 198/510 |
| 2,755,912 | 7/1956 | Ashton | 198/513 |
| 2,833,394 | 5/1958 | Cordis | 198/626 |
| 2,939,570 | 6/1960 | Dykeman | 198/512 X |
| 3,762,534 | 10/1973 | Beresinsky | 198/627 |
| 3,828,915 | 8/1974 | Cox et al. | 198/512 |

FOREIGN PATENT DOCUMENTS

1120361 12/1961 Fed. Rep. of Germany ........... 198/626

*Primary Examiner*—Jeffrey V. Nase
*Attorney, Agent, or Firm*—Sandler & Greenblum

[57] ABSTRACT

An elevator-conveyor for conveying bulk material over a predetermined path, at least a portion of which is in a vertical or near vertical direction, comprises a pair of juxtaposed belts between which the bulk material is to be located, and apparatus for applying air pressure directly on one or both of the outer belt surfaces when the belts are in the vertical or near vertical direction. The air pressure presses the belts towards one another and against the interposed bulk material so as to enclose the same; and at the same time, the juxtaposed longitudinal edge portions of the belts are pressed against each other to contain the bulk material. Apparatus is also provided for ensuring effective feeding of the conveyor and the mechanical sealing thereof against undesirable air flow. Provision is made for appropriate belts for use with the conveyor.

6 Claims, 38 Drawing Figures

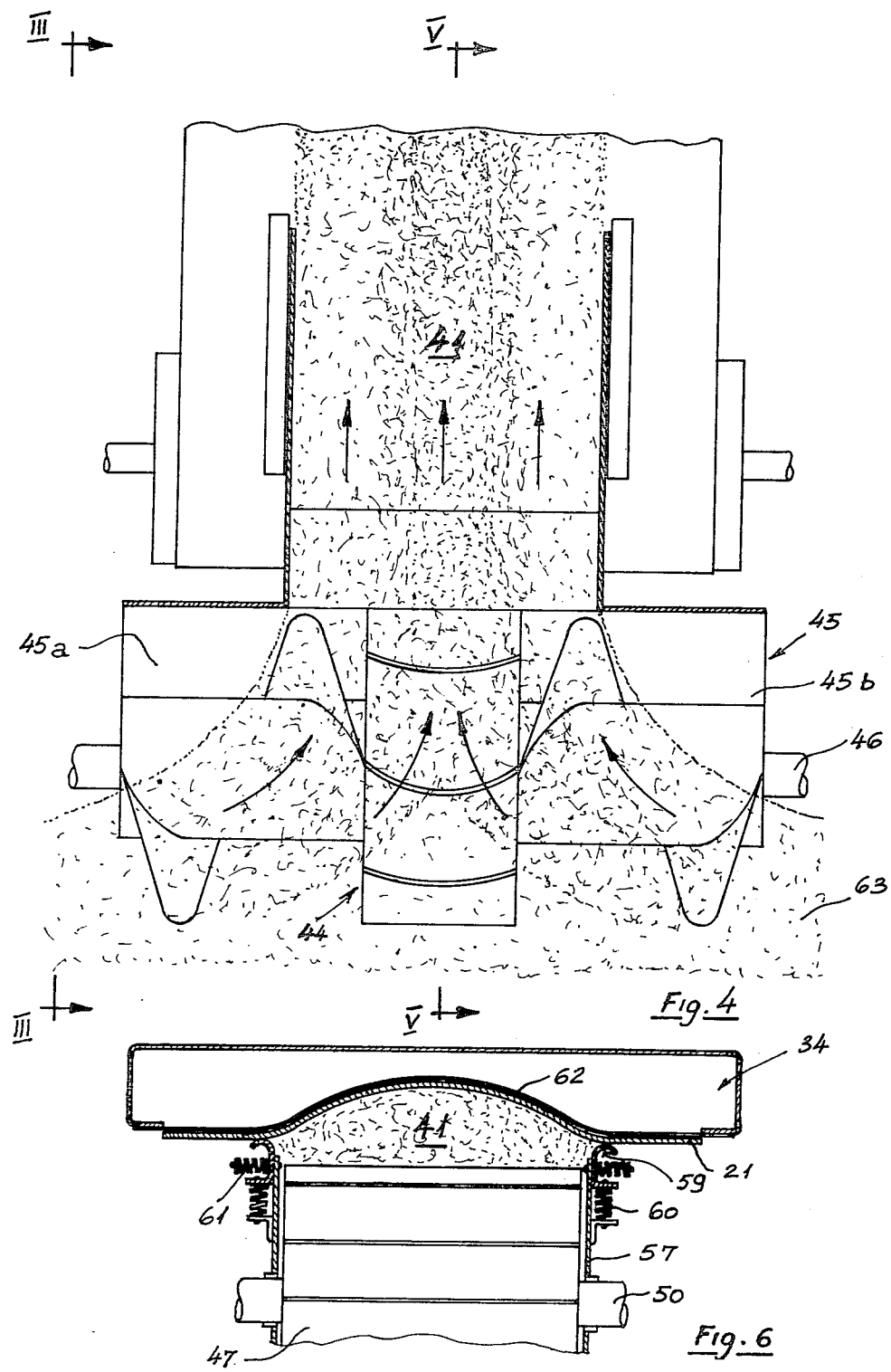

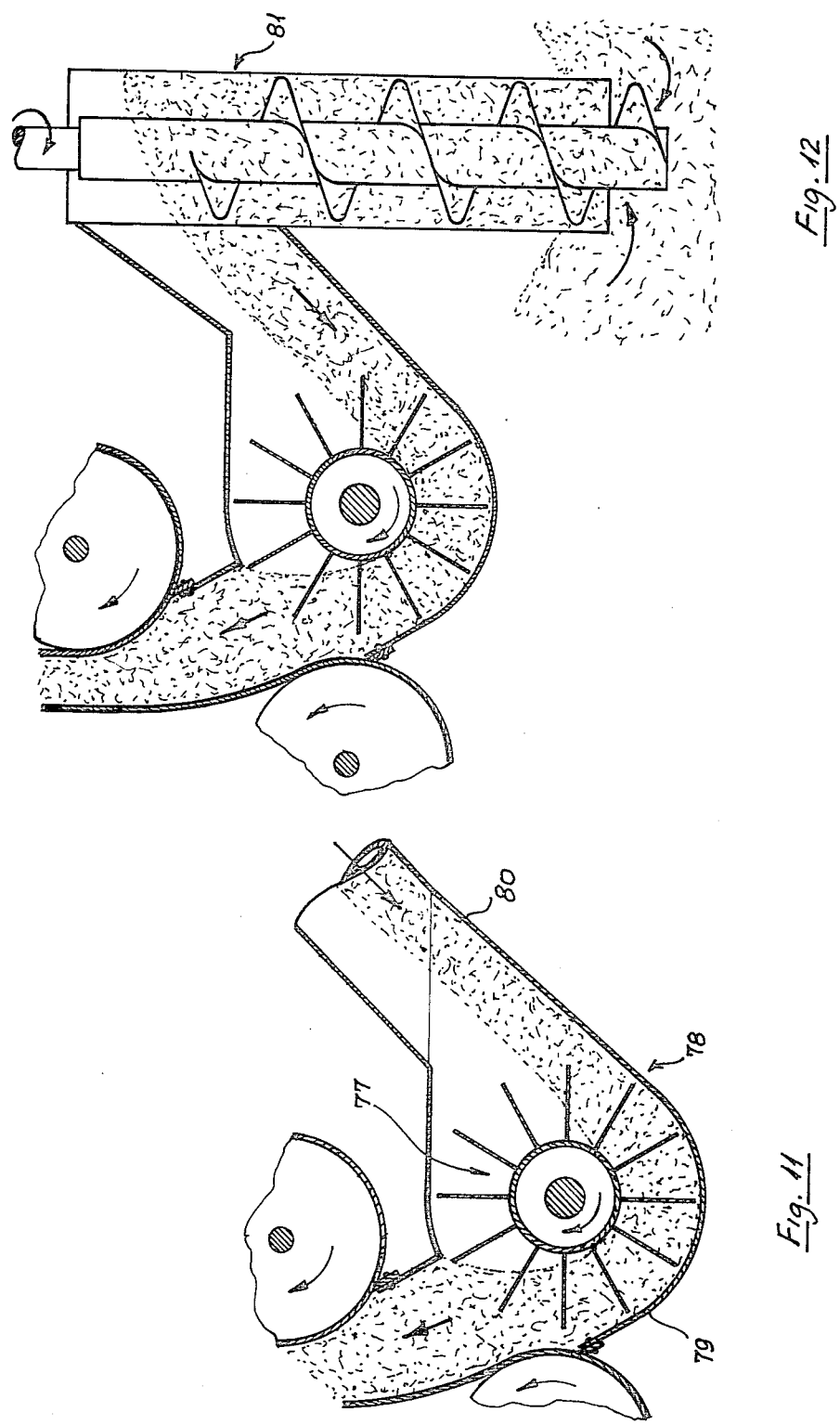

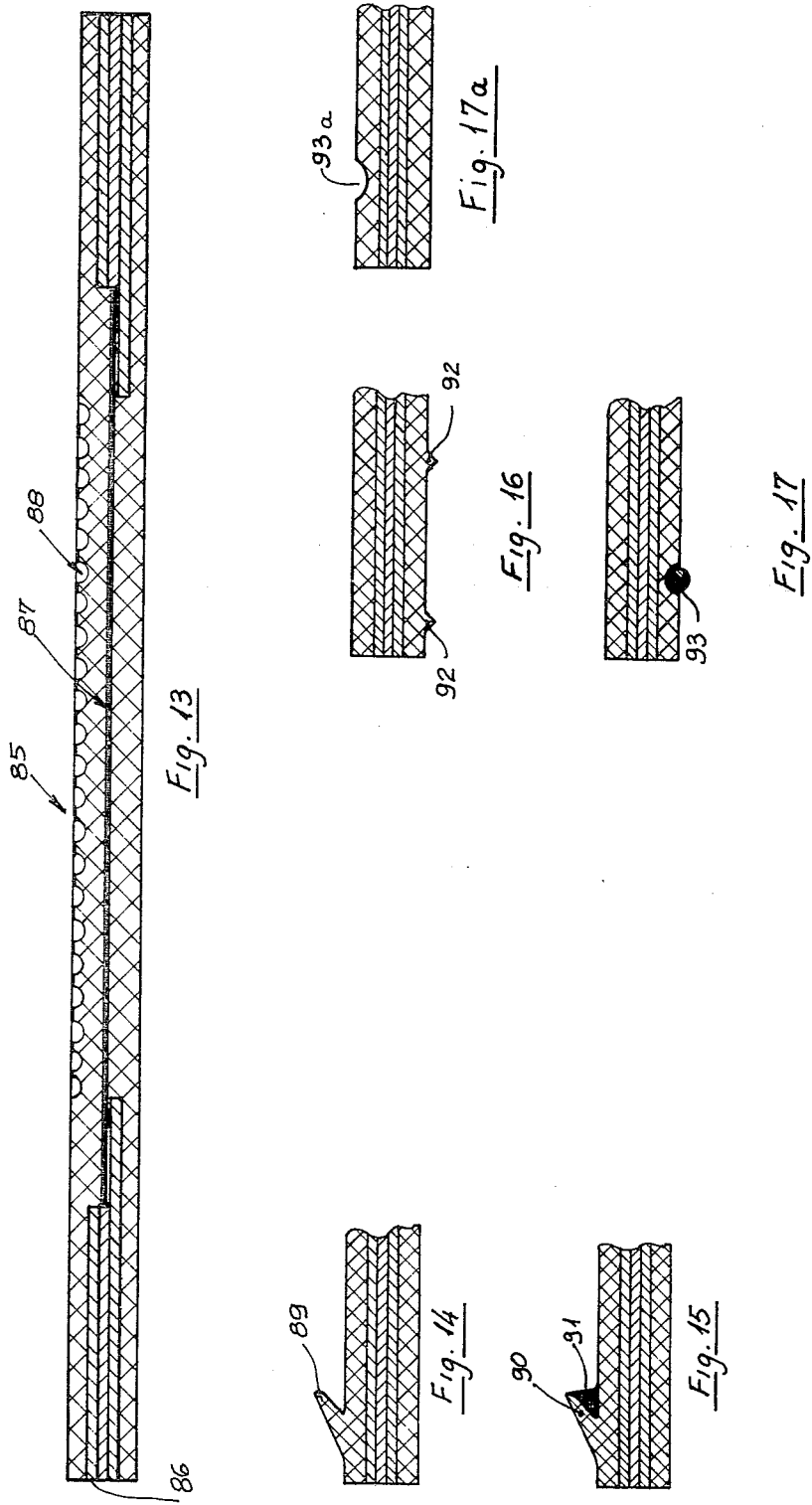

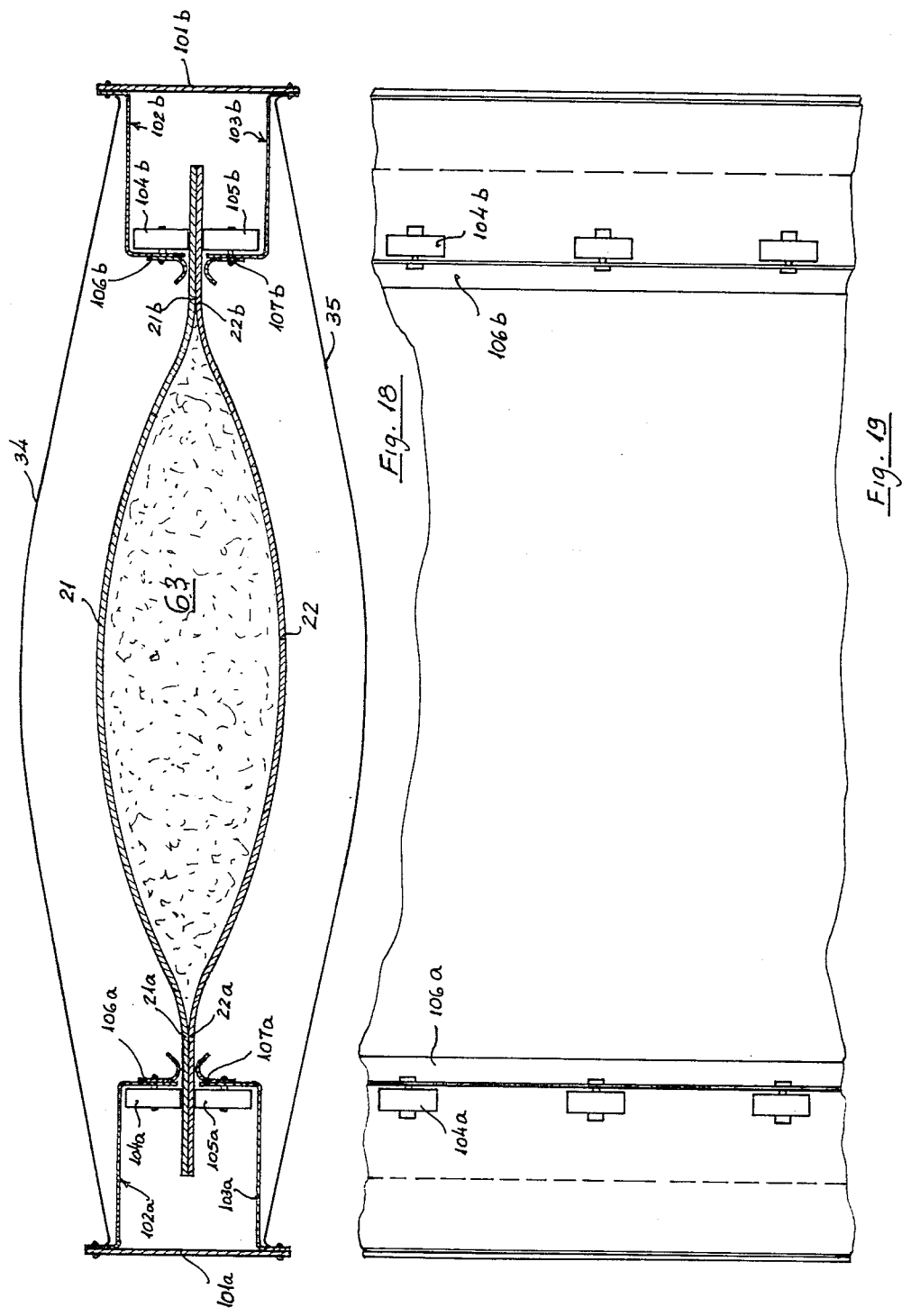

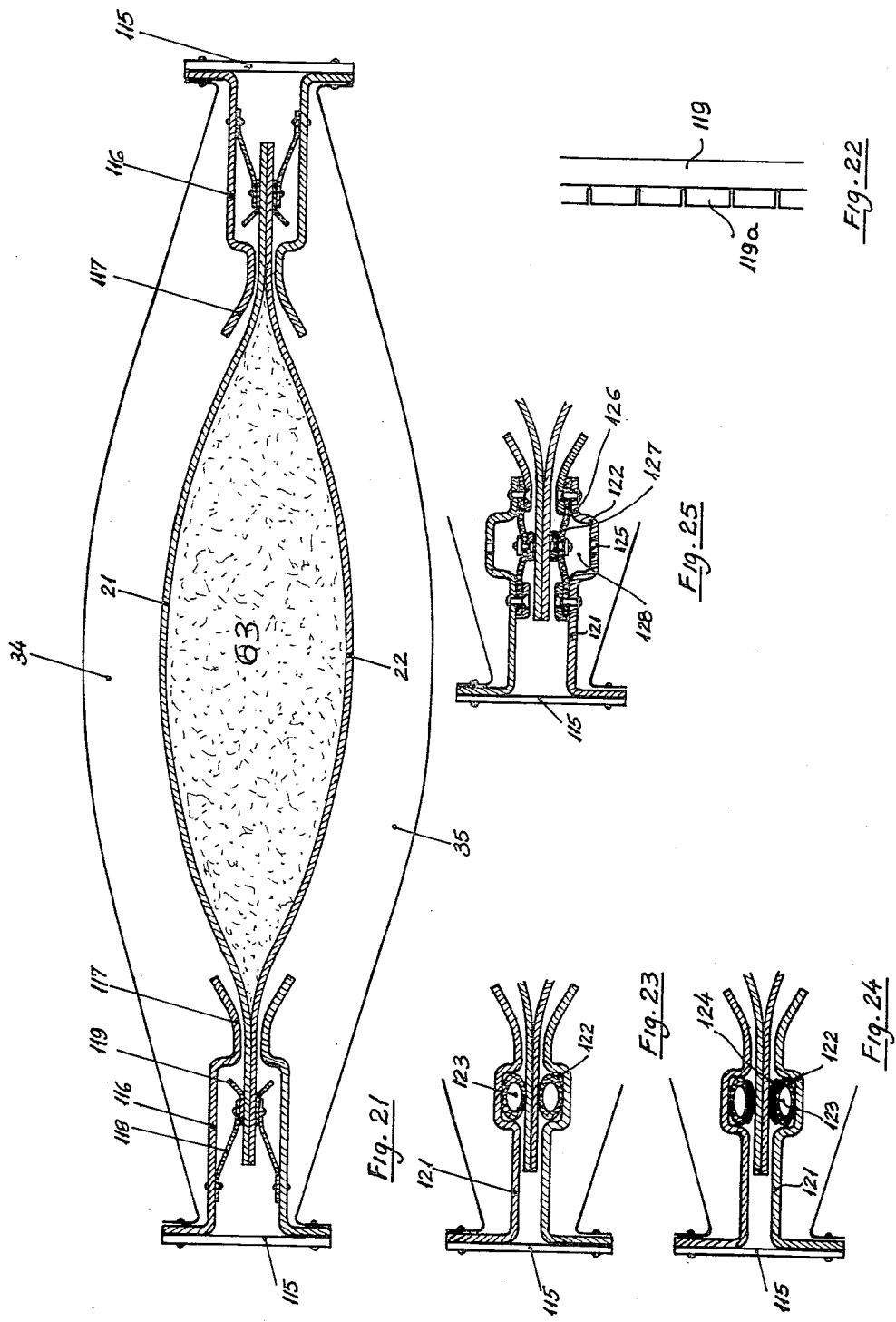

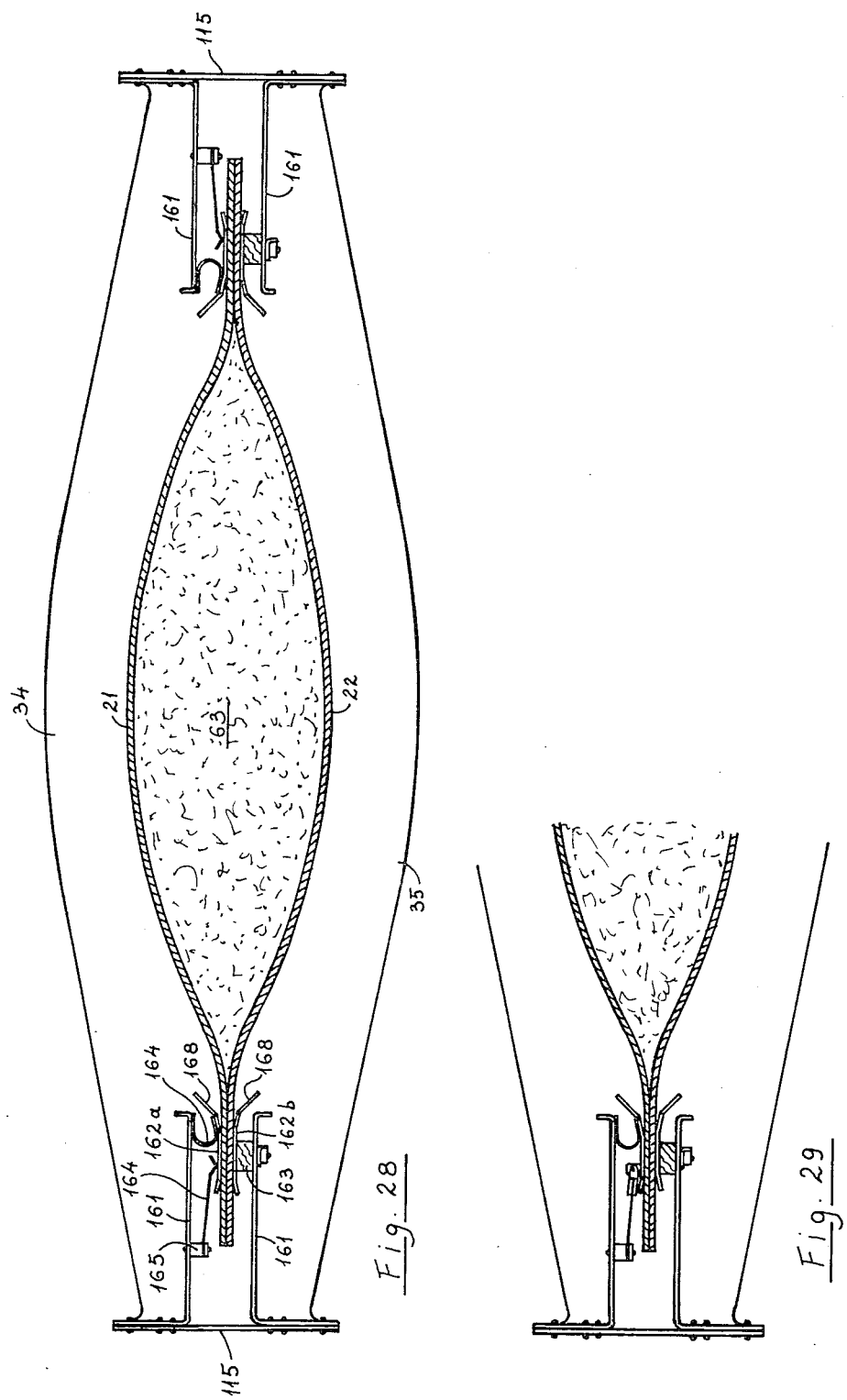

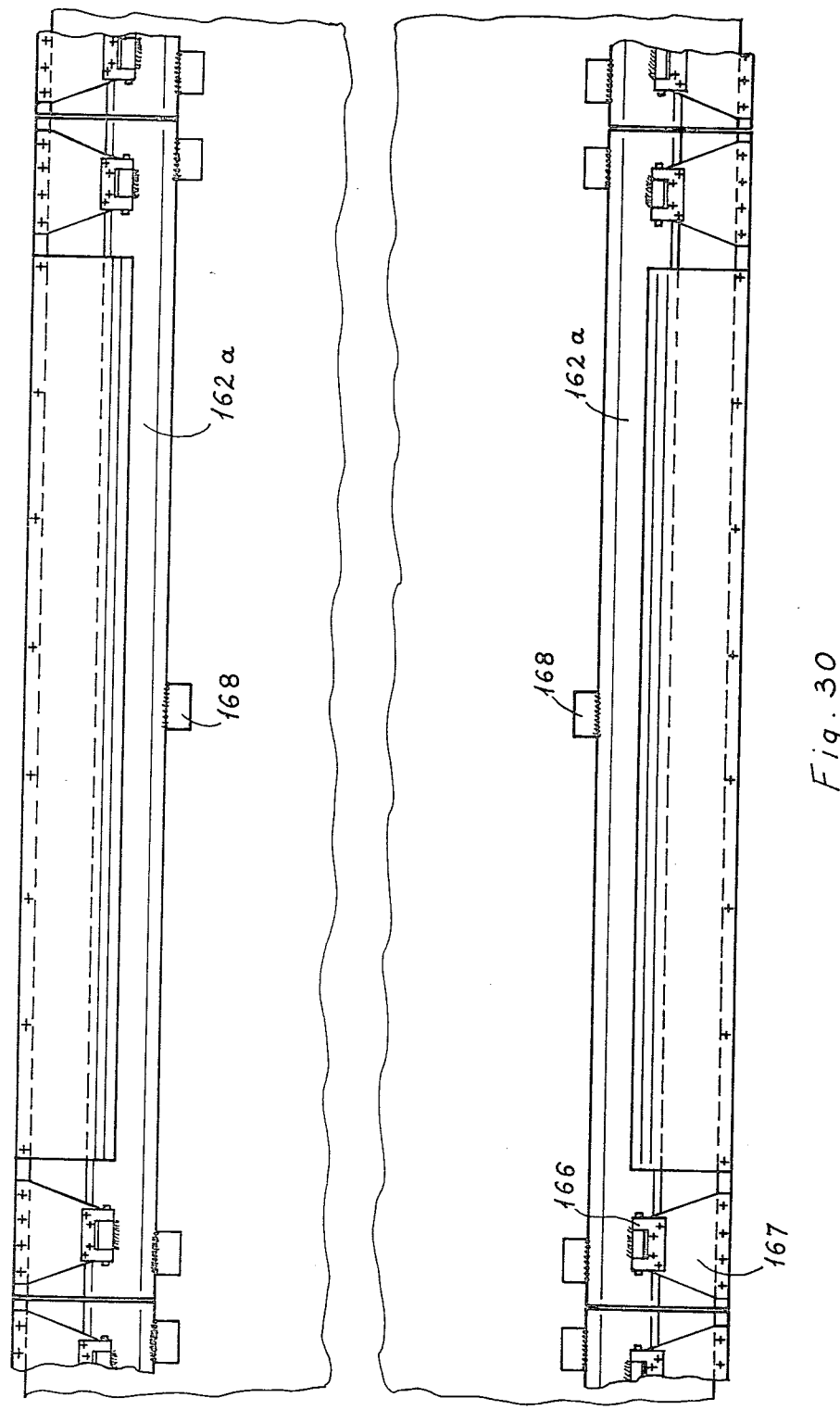

ELEVATOR-CONVEYOR FOR BULK MATERIAL

This invention relates to an elevator-conveyor designed to convey bulk material over a predetermined path, at least a portion of which path is in a vertical or near vertical direction, the bulk material being conveyed by a pair of juxtaposed belts between which the bulk material is located and which, in the vertical or near vertical direction, are pressed towards one another and against the interposed bulk material so as to enclose the same and so that the juxtaposed longitudinal edge portions of the belts are pressed against each other by means of air pressure acting directly on one or both of the outer belt surfaces. Such an elevator-conveyor, hereinafter to be referred to as "an elevator-conveyor of the kind specified," forms the subject of our U.S. Pat. No. 3762534 hereinafter referred to as "our prior patent" and to which attention is directed for a full description of the basic operating principles of an elevator-conveyor of the kind specified.

Such an elevator-conveyor, of the kind specified, can be employed as a static installation, in a silo or the like in which case the elevator-conveyor and the feed mechanism thereof, as disclosed in our earlier patent, can readily be employed. Alternatively, however, the elevator-conveyor can be included in a mobile device such as, for example, a ship's unloader in which case the feed or input end of the elevator-conveyor is to be introduced into a relatively confined region such as, for example, a ship's hold, and the particular form of elevator-conveyor and feed mechanism previously disclosed may not be readily adaptable for use under such conditions.

It is an object of the present invention to provide an elevator-conveyor of the kind specified and feed mechanism for use therewith which can readily be used under the conditions referred to above.

According to the present invention there is provided an elevator-conveyor for conveying bulk material over a predetermined path, at least a portion of which path is in a vertical or near vertical direction and comprising a pair of juxtaposed belts between which the bulk material is to be located and air pressure means adapted to act directly on one or both of the outer belt surfaces when the belts are in the vertical or near vertical direction so that the belts are pressed towards one another and against the interposed bulk material so as to enclose the same and so that the juxtaposed longitudinal edge portions of the belts are pressed against each other, the improvement wherein a portion of the elevator conveyor, designed to be located in the vertical or near vertical direction includes a terminal region having a feed zone into which the bulk material is fed, said terminal region comprising a terminal portion of one of said belts which is spaced away from a corresponding terminal portion of the other belt so as to define an exposed belt region, and a feed mechanism juxtaposed with respect to said exposed belt region for feeding said material on to said exposed belt region.

According to one preferred aspect of the present invention there is provided in or for use in an elevator-conveyor of the kind in accordance with the invention, a feed mechanism comprising material gathering means and material projecting means, said gathering means being arranged to gather said bulk material onto said projecting means, the latter being arranged to project said bulk material upwardly and outwardly onto said exposed belt region.

Various embodiments of material gathering means and material projecting means are provided for within the framework of the present invention.

By virtue of the fact that the feed zone is disposed adjacent the exposed belt region, which, being located in the vertical or near vertical direction, is upstream of a lowermost drum or pulley over which the belt passes before entering the feed zone, it is ensured that the distortion of the belt by the enclosed bulk material only occurs after it has passed this lowermost drum and, in consequence no special, complex sealing arrangements have to be associated with this drum as is the case where a portion of the belt distorted by the material passes thereover.

As indicated in our earlier patent the air pressure can be applied to one or both of the belts by their passing through either a unitary air pressure box or by having each belt pass through a separate air box. In both cases means have to be provided for ensuring that a minimum amount of air escapes from the box at either end thereof where the belts enter and leave. However, in the case where the belts are subjected to air pressure originating in two separate boxes means have to be provided for ensuring minimal air escape from the separate boxes via the adjacent belt surfaces.

It is therefore an object of the present invention to ensure that such means are provided, reducing to a minimum the degree of air loss from the separate boxes with respect to the belts.

According to the present invention therefore there is provided, in an elevator-conveyor of the kind specified wherein at least one of said belts passes through an elongated air box when travelling in said vertical or near vertical direction, mechanical sealing means for reducing to a minimum, air flow from said air box via the longitudinal edge portions of said belts.

In the various embodiments disclosed in accordance with the present invention for ensuring the provision of these mechanical sealing means, care is taken to ensure that the moving belts come into contact with relatively stationary elements of the equipment for minimal periods of time and, where such contact takes place, it should be under minimal pressure and via elements having minimal frictional resistance to movement. For this purpose sealing strips and the like are provided which are formed of stainless steel or of like low friction materials.

In order to ensure that the belts firmly and tightly envelope the enclosed material whilst at the same time ensuring that the juxtaposed longitudinal edge portions of the belts remain firmly pressed together under the influence of the applied air pressure, special belt constructions are envisaged in accordance with the present invention in accordance with which the belt is formed of a resiliently flexible, air-impermeable material, longitudinal edge portions of the belt being provided with reinforcing plies so as to impart the required strength to the edge portions and an increased rigidity of the edge portions vis-a-vis a longitudinal median portion.

Preferably the longitudinal median portion is reinforced against tearing by one or more plies of extendable material.

The elevator-conveyor in accordance with the present invention can be employed in a mobile installation such as, for example, a ship's unloader in which case the elevator portion can be incorporated in an elevator column which is articulated to a boom which incorporates the conveyor portion. With such a ship's unloader a considerable relative freedom of movement exists between the various components of the elevator-conveyor which can be articulated with respect to each other. Alternatively the elevator-conveyor in accordance with the present invention can be incorporated in a static installation for use, for example, in a silo or the like.

Figure 2:
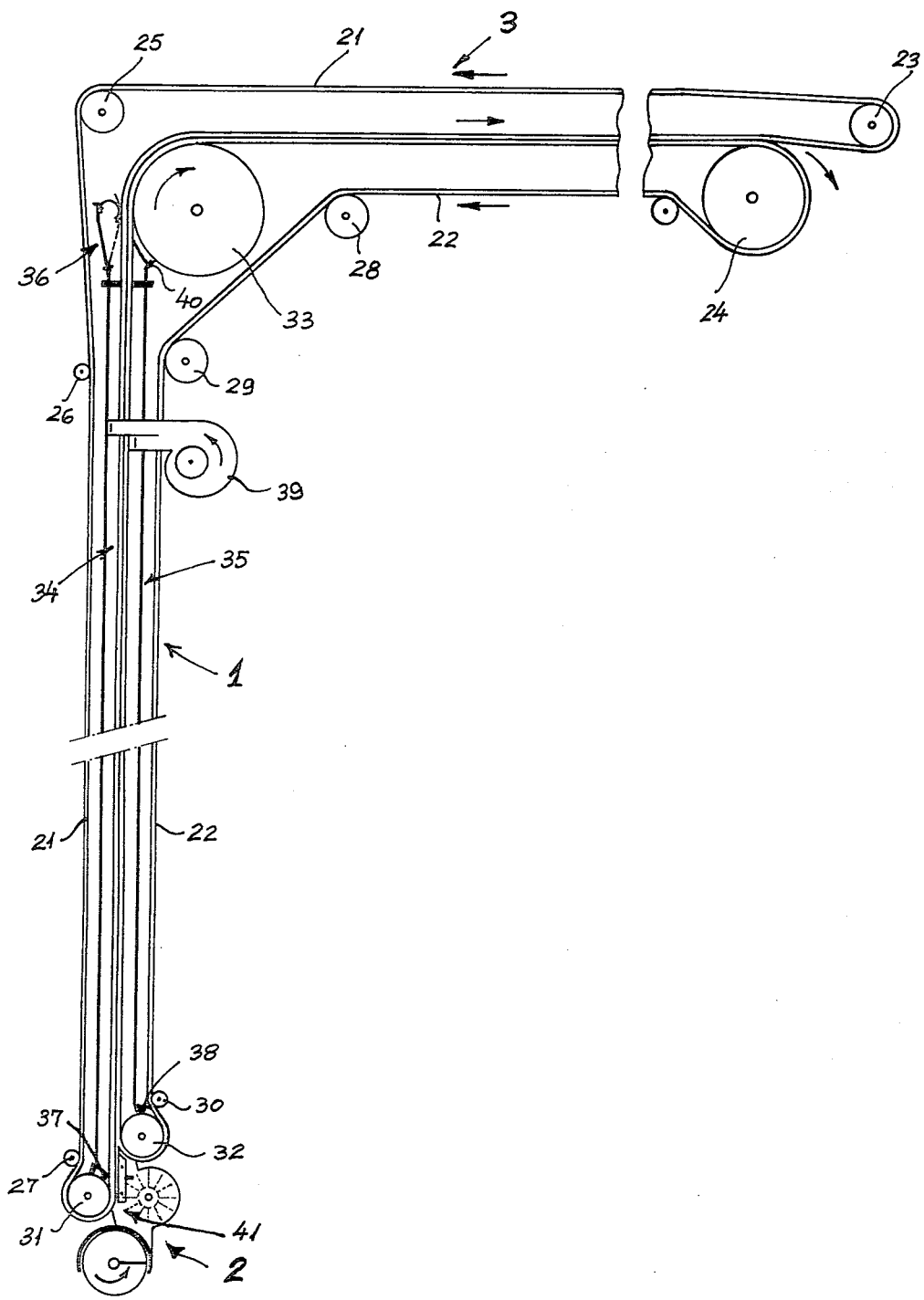
Figure 3:
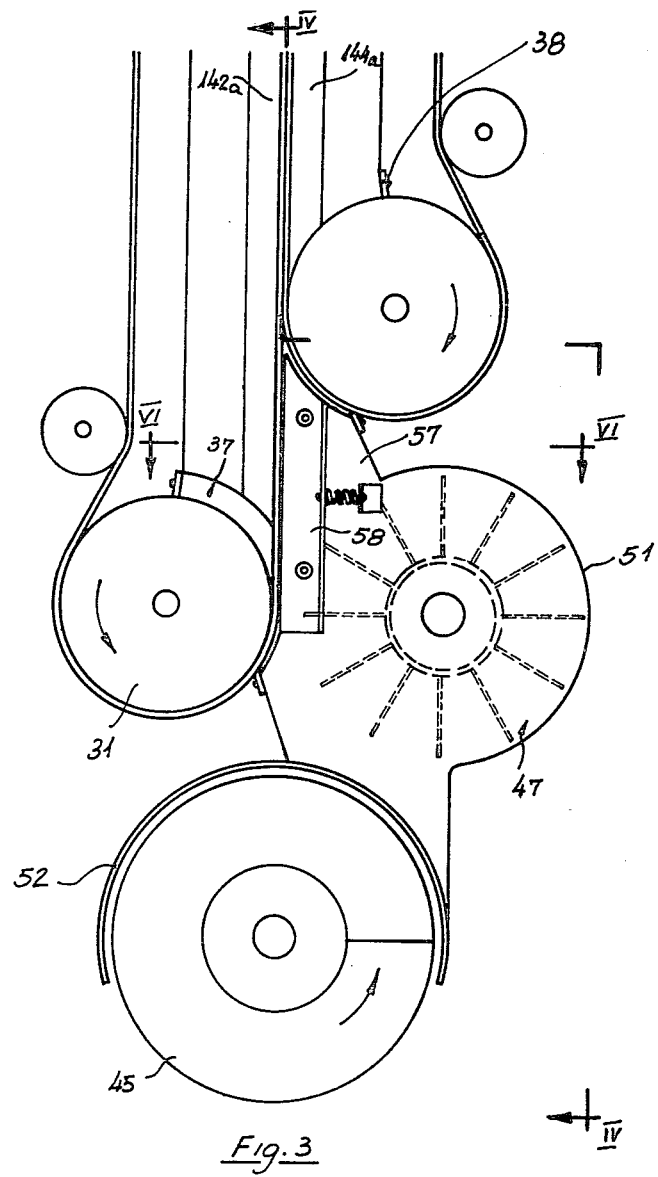
Figure 7:
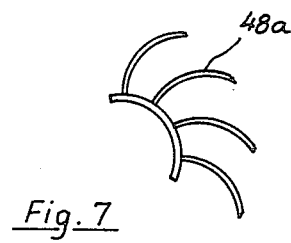
Figure 5:
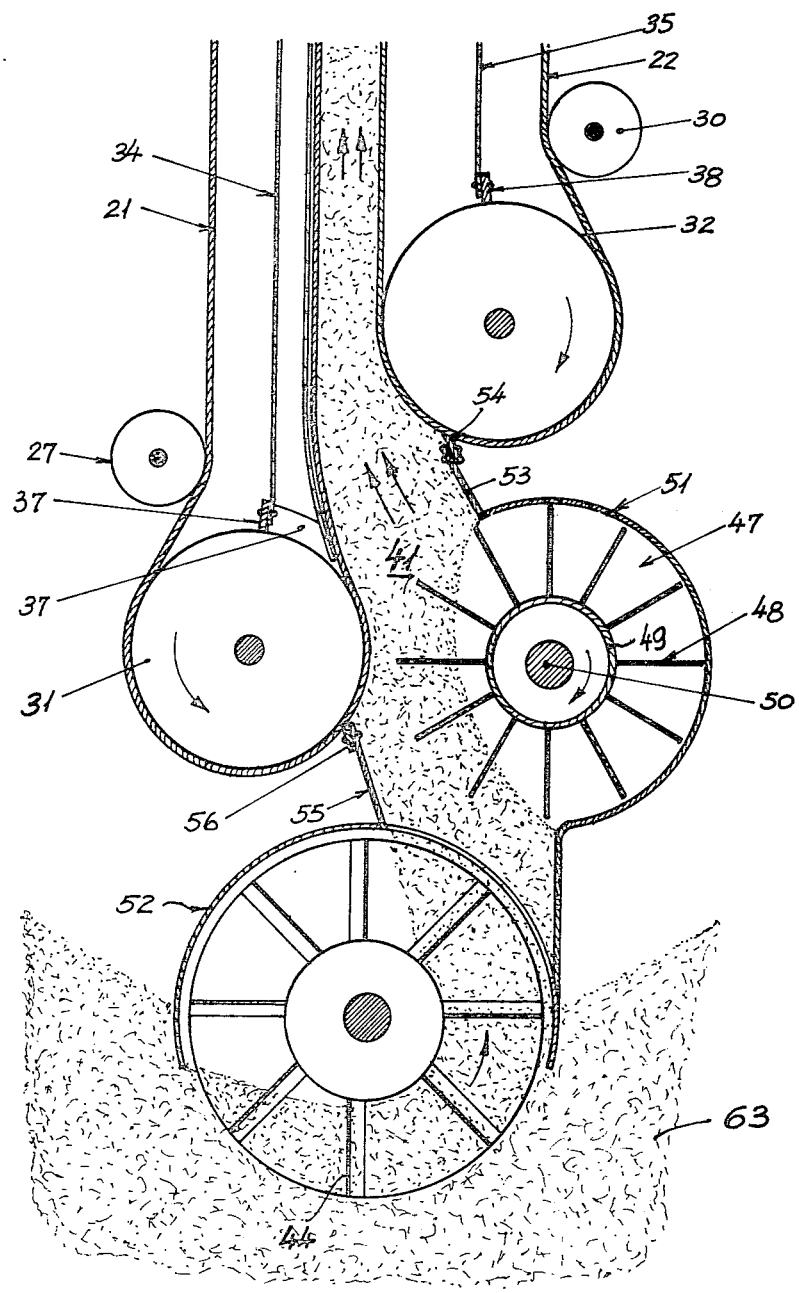
Figure 8:
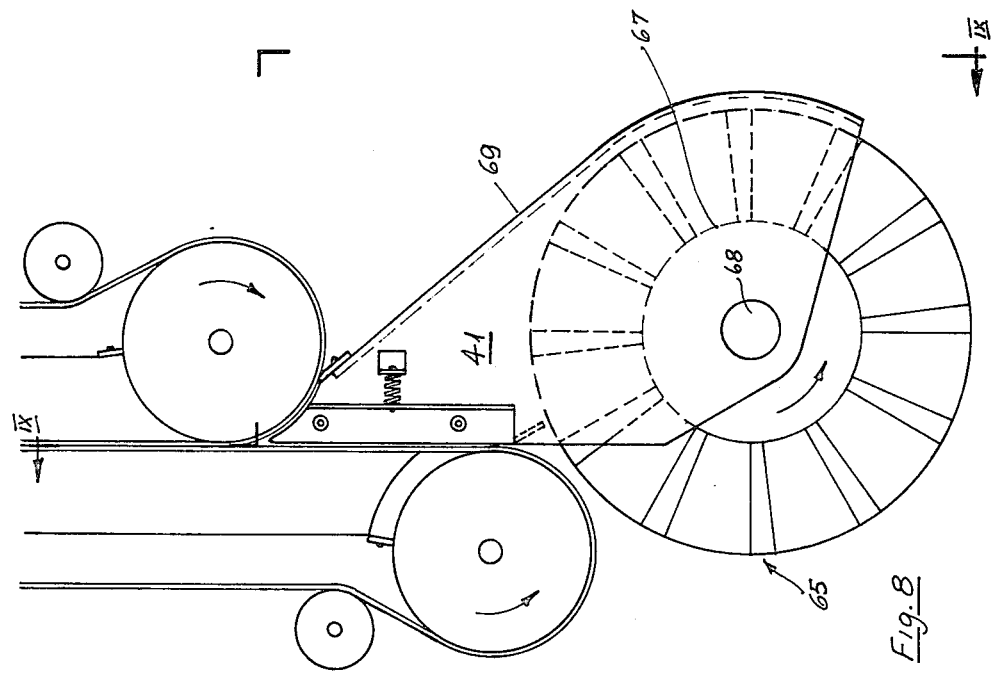
Figure 9:
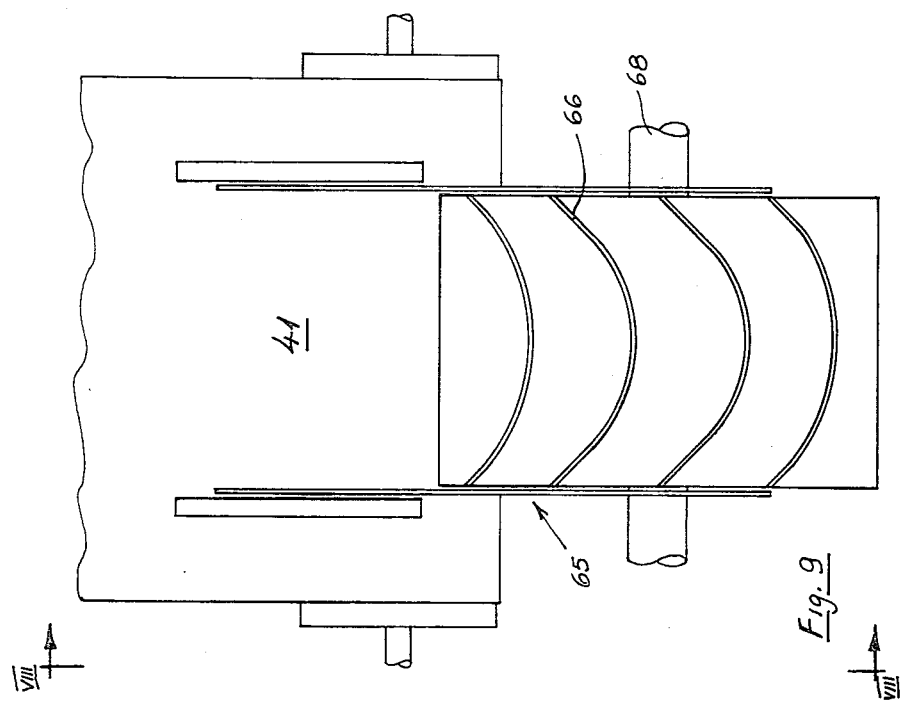
Figure 10:
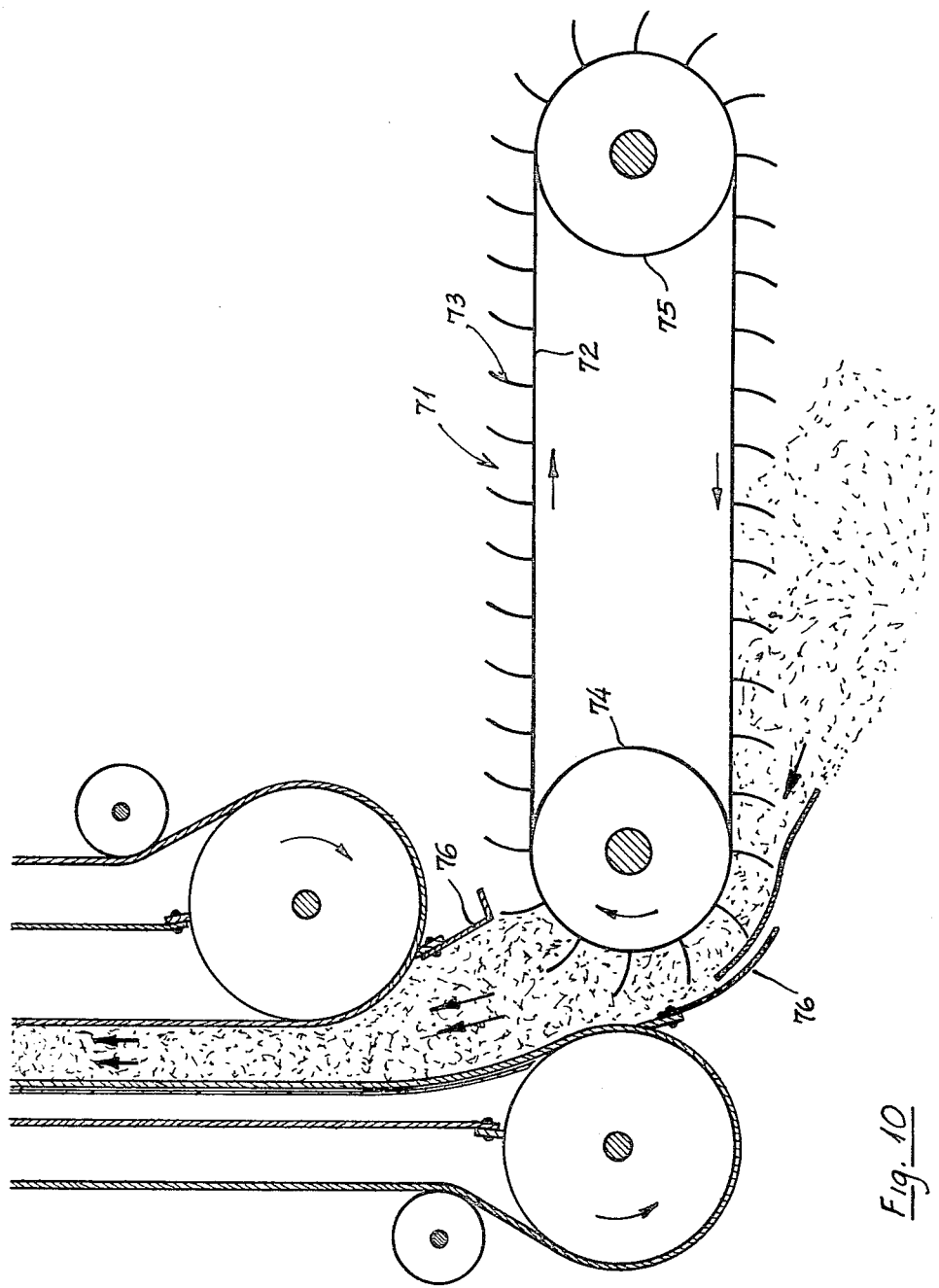
Figure 12A:
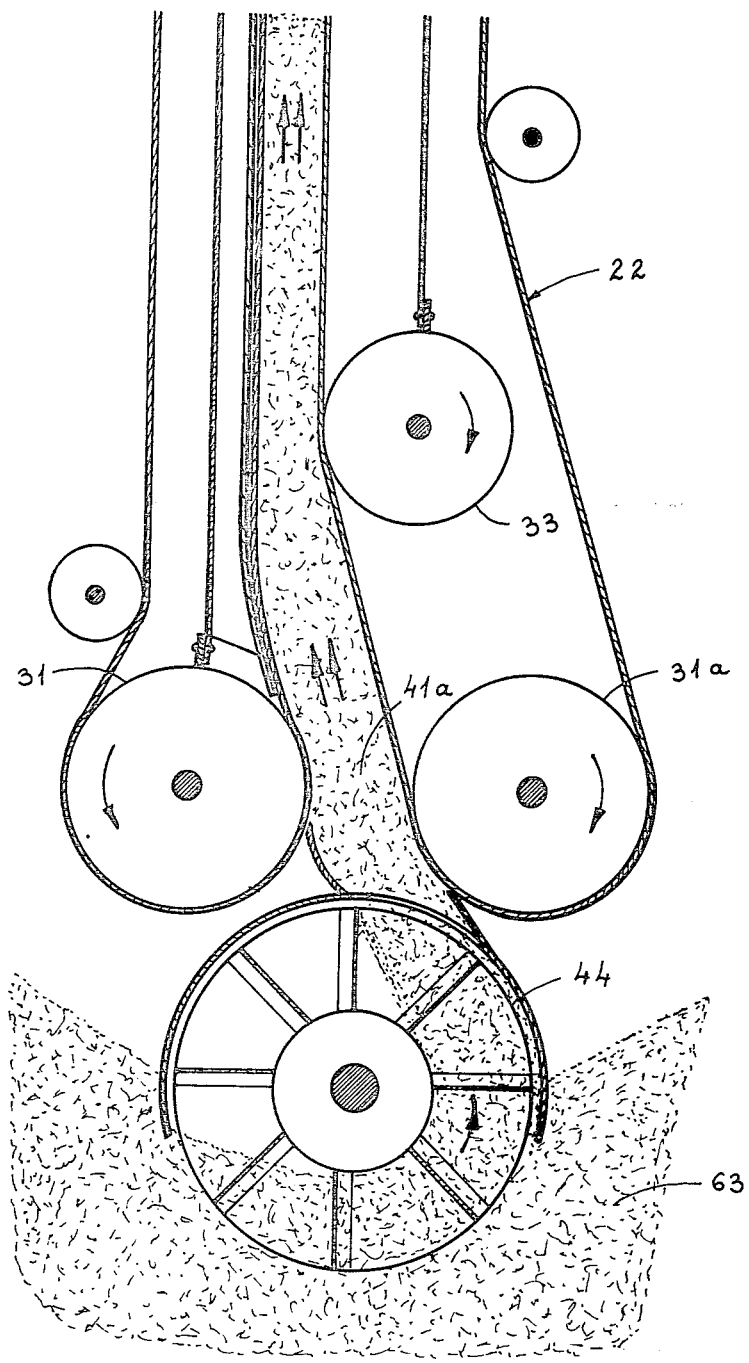
Figure 12B:
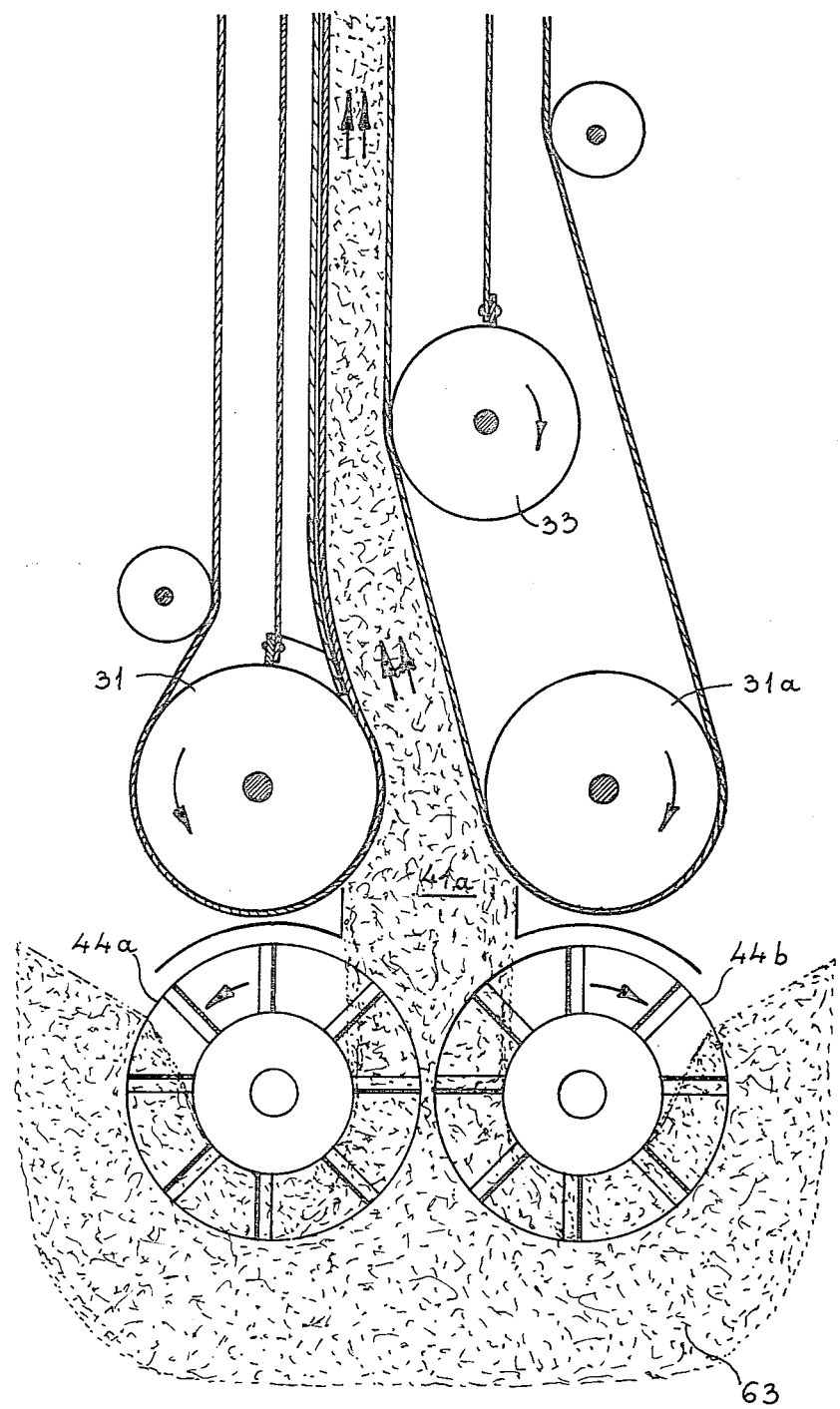
Figure 20:
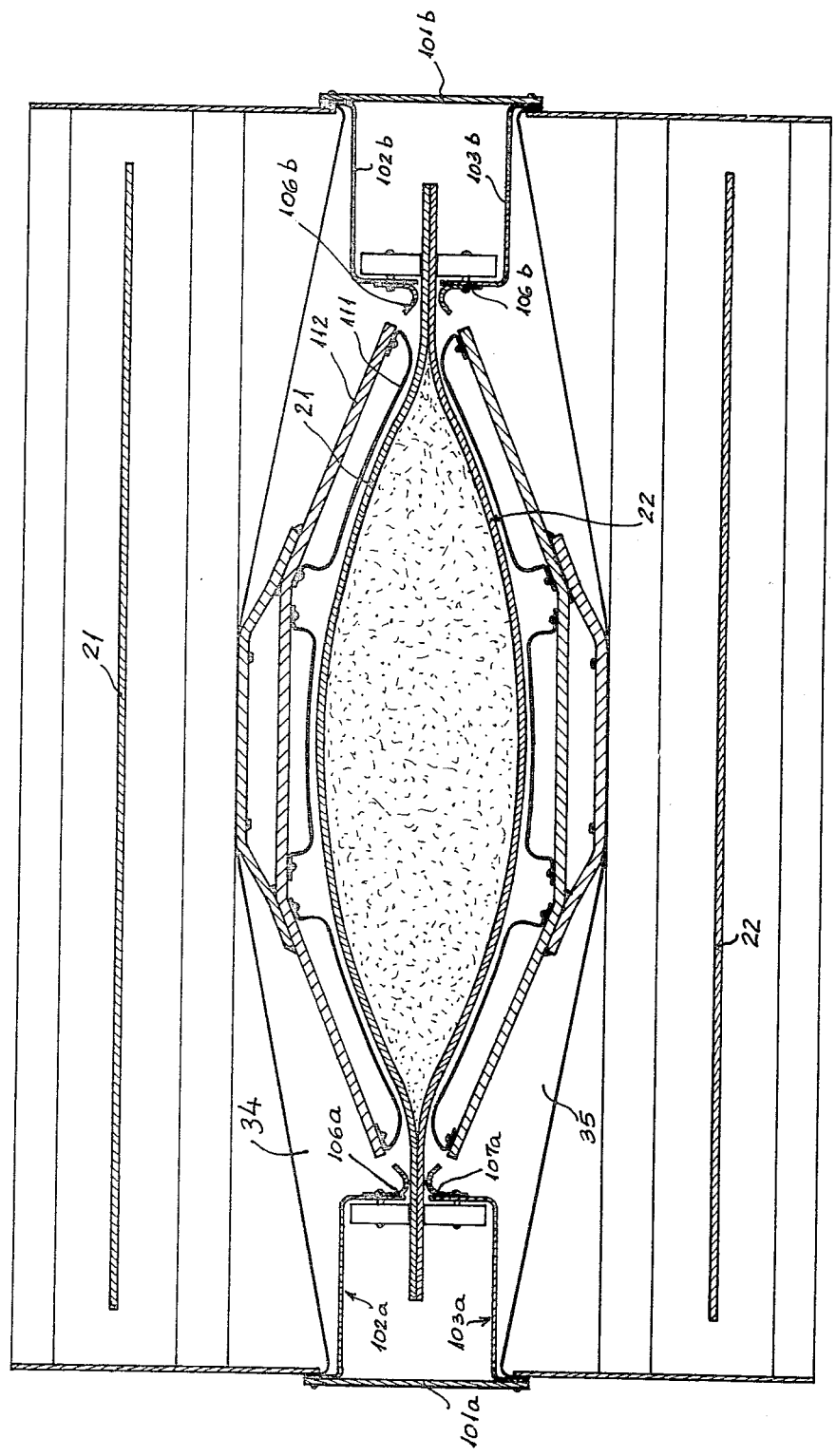
Figure 31:
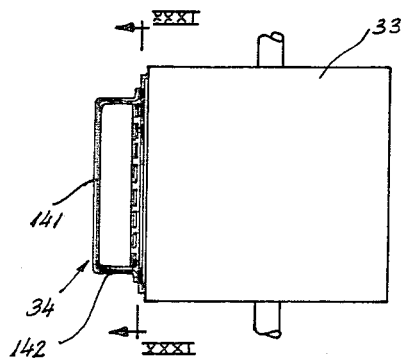
Figure 33:
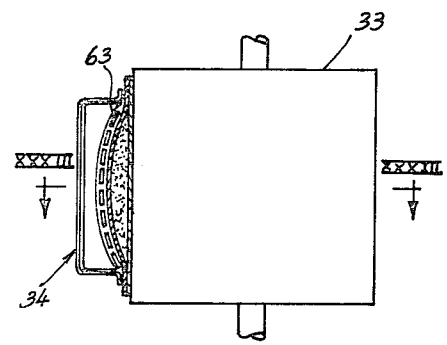
Figure 32:
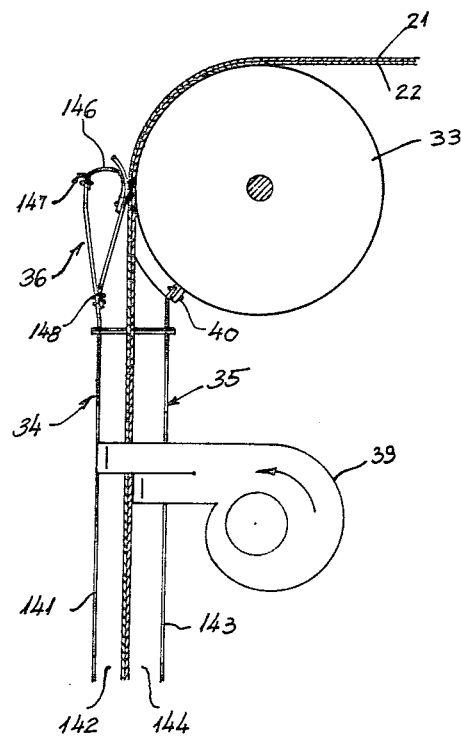
Figure 34:
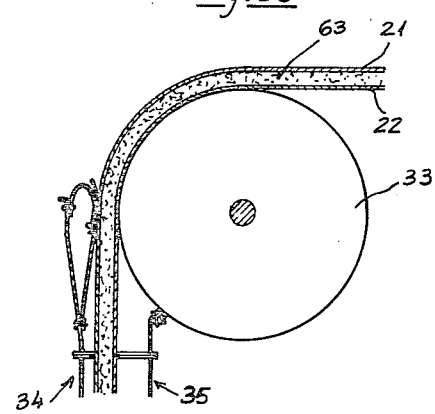
Figure 35:
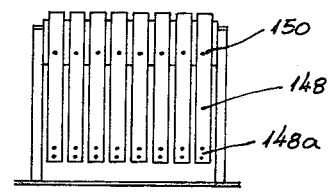

For a better understanding of the present invention and to show how the same may be carried out in practice reference will now be made to the accompanying drawings in which:

FIG. 1 is a side elevation of a ship's unloader incorporating an elevator-conveyor according to the present invention, FIG. 2 is a schematic side elevation of a portion of the elevator-conveyor shown in FIG. 1 with a covering casing removed, FIG. 3 is a schematic, side elevation of one embodiment of a feed mechanism shown associated with an elevator-conveyor as seen in FIG. 2, FIG. 4 is a schematic, front elevational view of the feed mechanism shown in FIG. 3 taken along the line IV—IV with various elements removed so as to show more clearly the operation of the mechanism, FIG. 5 is a longitudinally sectioned side elevation of the feed mechanism and conveyor-elevator shown in FIGS. 3 and 4 taken along the line V—V of the view shown in FIG. 4, FIG. 6 is a cross-sectional view of the feed mechanism and elevator-conveyor taken along the line VI—VI of the view shown in FIG. 3, FIG. 7 shows a modification of a detail of the feed mechanism shown in FIGS. 3–6, FIG. 8 is a schematic, side elevation showing a differing embodiment of feed mechanism associated with an elevator-conveyor in accordance with the invention, FIG. 9 is a front elevational view of the feed mechanism and elevator-conveyor shown in FIG. 8 taken along the line IX—IX with various elements removed so as to show more clearly the operation of the mechanism, FIG. 10 is a schematic side elevation (partially sectioned) of a further form of feed mechanism shown associated with an elevator-conveyor in accordance with the invention, FIGS. 11 and 12 are respective, longitudinally sectioned, schematic elevations of still further forms of feed mechanisms for use with an elevator-conveyor in accordance with the present invention, FIGS. 12a and 12b are views similar to that shown in FIG. 5 of respectively modified forms of feed mechanism and elevator-conveyor, FIG. 13 is a cross-sectional view of one form of conveyor belt for use in an elevator-conveyor in accordance with the present invention, FIGS. 14, 15, 16, 17 and 17a are respective cross-sectional views of modifications of the edge portions of the conveyor belt as shown in FIG. 13, FIG. 18 is a cross-sectional view of a detail of an elevator-conveyor in accordance with the present invention, FIG. 19 is a front elevation of a detail of the view shown in FIG. 18, FIG. 20 is a cross-sectional view of a further modification of an elevator-conveyor in accordance with the present invention, FIG. 21 is a cross-sectional view of a detail of a further modification of an elevator-conveyor in accordance with the present invention, FIG. 22 is a front elevation of a detail of the modification shown in FIG. 21, FIGS. 23, 24, 25, 26 and 27 are cross-sectional views of modifications of a detail shown in FIG. 21, FIG. 28 is a cross-sectional view of a modified form of elevator-conveyor in accordance with the invention, FIG. 29 is a cross-sectional view of the elevator-conveyor shown in FIG. 28 at a longitudinally spaced apart location, FIG. 30 is a front elevation of the elevator-conveyor shown in FIGS. 28 and 29, FIG. 31 is a plan view from above of a detail of the elevator-conveyor shown in FIG. 2 with the superimposed belts fully in contact with each other, FIG. 32 is a longitudinally sectioned view of a detail shown in FIG. 31 taken along the line XXXII—XXXII, FIGS. 33 and 34 are views corresponding to FIGS. 31 and 32 with the superimposed belts partially separated by enclosed material, and FIG. 35 is a front elevation of a detail of the portion of the elevator-conveyor shown in FIGS. 31–34.

As seen in FIG. 1 an elevator-conveyor, in accordance with the present invention, is incorporated in a ship's unloader. The elevator-conveyor which is of the kind described in detail in our previous patent specification is incorporated in an elevator column 1 which is provided at a lower end thereof with a feed mechanism 2 and is pivotally articulated at an upper end thereof to a conveyor boom 3. The feed mechanism 2 is provided with a pressure sensitive diaphragm 2a coupled via a servomechanism (not shown) to means (not shown) for indicating when the feed mechanism is fully immersed in material to be conveyed. The boom 3 is pivotally articulated to a central column 4 which is, in its turn, mounted, via a slewing ring 5, on a portal 6. The portal 6 is displaceably located on a quay 7 via wheels 8 and rails 9. The elevator column 1 is coupled to the elevator boom 3 via hydraulic cyinders 10 whilst the central column 4 is coupled to the elevator boom 3 via hydraulic cylinders 11 and a bearing 12. The portal 6 is furthermore provided with a hydraulic slewing motor (not shown). Finally the unloader is coupled to an unloading store (not shown) by means of an unloading bridge 13. The direction of flow of material from the feed mechanism 2 through the elevator column 1, elevator boom 3, central column 4 and out of the bridge 13 is shown by the broken line 14. The unloader itself is displaceable along the rails 9 as required by hydraulic drive means (not shown).

Thus, as can be clearly seen in FIG. 1 of the drawings, the unloader is capable of considerable freedom of movement. In the uppermost position a, shown in chain dotted lines, the unloader is in a parking position with the elevator column 1 and elevator boom 3 raised into substantially vertical positions. In the intermediate position b, shown in full lines, the unloader is shown with the elevator column 1 and elevator boom 3 elevated and at an acute angle with respect to each other prior to the descent into a ship's hold. In the position c, the elevator column 1 and elevator boom 3 are shown in the lowermost position, at an obtuse angle with respect to each other, for example, in a ship's hold. As can be seen the elevator column 1 can be arranged to be held at an acute angle with respect to the vertical and in this way the feed mechanism 2 can be positioned in remote corner positions of a hold as required.

Reference will now be made to FIG. 2 of the drawings for a general description of the elevator-conveyor incorporated in the ship's unloader shown in FIG. 1. This elevator-conveyor is of the general kind forming the subject of our earlier patent to which reference is directed for a more complete description. As seen in FIG. 2 the elevator-conveyor comprises a pair of conveyor belts 21 and 22 which are driven by a pair of drive drums 23, 24 over which they respectively pass. The uppermost belt 21 passes out of the boom 3 and into the elevator column 1 over an idler pulley 25 and is inwardly constrained by a pair of outwardly disposed rollers 26 and 27. The lowermost belt 22 on the other hand passes out of the boom 3 over a pair of idler pulleys 28 and 29, and is constrained inwardly by an outwardly disposed roller 30. The belt 21 passes over a lowermost drum 31 before it starts its upward ascent in the elevating, working region of the arrangement. Similarly the belt 22 passes over a lowermost drum 32 before it in its turn starts its upward ascent in the elevating working region of the mechanism. As can be seen, the drum 32 is located upstream with respect to the drum 31 and in consequence the lowermost portion of the upwardly ascending belt 21 is exposed, i.e. is not juxtaposed by the belt 22. This lowermost portion of the belt 21 is disposed adjacent the feed mechanism 2 to be described in detail below.

The two belts 21 and 22 continue their upward ascent juxtaposed with respect to each other and emerge, in this juxtaposed condition, from the elevator column 1 passing into the conveyor boom 3 over a drum 33. The juxtaposed belts 21, 22 proceed along their path until they respectively pass over the drive drums 23 and 24 adjacent an outlet of the mechanism.

As is described in greater detail in our earlier patent specification, the upwardly ascending, juxtaposed belts 21, 22 are respectively and sealingly located along the open sides of a pair of elongated, air pressure boxes 34 and 35. These boxes extend along and open onto the outer surfaces of the upwardly ascending belts 21, 22, substantially from the lower drums 31 and 32 to the upper drum 33. The upper end of the box 34 is substantially sealed against any substantial air loss with respect to the portion of the belt 21 passing over the drum 33 by means of a sealing mechanism 36 to be described in detail below. The lowermost ends of the boxes 34 and 35 are respectively sealed with respect to the drums 31 and 32 by transverse and end flexible sealing strips 37 and 38 which sealingly bear against the surfaces of the drums 31 and 32. Similarly, the uppermost end of the box 35 is sealed with respect to the surface of the drum 33 by means of transverse and end flexible strips 40 which sealingly bear against the drum 33. Compressed air is fed to the boxes 34 and 35 by an air compressor 39 shown schematically in the drawings.

The material to be conveyed is fed by the feed mechanism 2 in an upward direction into a feed zone 41 and onto the exposed, upwardly advancing, surface of belt 21 and is immediately thereafter enclosed and covered by the juxtaposed belt 22. The two juxtaposed belts 21 and 22 are pressed against each other at their edge portions and against the enclosed material by the super atmospheric pressure acting on the belt surfaces passing through the boxes 34 and 35. The material is continuously elevated with the enclosing belts 21, 22 until the belts pass out of the boxes 34, 35, over the roller 33, through the transverse section located in the conveyor boom 3, finally dropping through the central column 4 and being conveyed out of the unloader via the bridge 13.

Reference will now be made to FIGS. 3–12b of the drawings for a description of various forms of feed mechanisms which can be employed with an elevator-conveyor as just described.

In the embodiment shown in FIGS. 3–7 of the drawings the feed mechanism comprises a screw conveyor 45 mounted on a driven axle 46 and consisting of a lefthand flight 45a and a righthand flight 45b and a centrally disposed set of substantially radially extending paddles 44. Upon the rotation of the screw conveyor 45 in material 63 to be loaded, the material 63 is moved on to the paddles 44 and concentrated in the central portion of the screw conveyor which, in the present case is located directly below the juxtaposed ascending belt portion 21. Mounted above the paddles 44 and the central portion of the screw conveyor 45 is a thrower wheel 47 (not shown in FIG. 4) comprising a plurality of substantially radially disposed paddle blades 48 which radiate from a hub 49 mounted on a driven axle 50 which is disposed parallel to the driven axle 46 of the screw conveyor 45. The thrower wheel 47 is mounted within a casing 51 which is formed integrally with a casing 52 which extends over the upper portion of the screw conveyor 45. An integrally formed casing wall 53 is sealed with respect to the belt surface passing over the drum 32 by means of a flexible sealing strip 54. Similarly, a casing wall 55, formed integrally with the casing 52 is sealed against the belt surface 21 passing over the drum 31 by sealing strip 56. The enclosure surrounding the feed zone 41 is completed by side walls 57 of the casing 51, each side wall 57 having, articulated thereto, an angled sealing strip 58 having a curved sealing edge 59 (seen clearly in FIG. 6 of the drawings). The sealing strips 58, which are respectively spring mounted with respect to the side walls 57 have the sealing edges 59 biased against the opposite belt portions 21 by means of biasing springs 60. The strips 58 are also inwardly biased with respect to the casing 57 by biasing springs 61.

Drive means (not shown) are provided for driving the screw conveyor 45 and the throwing wheel 47. Thus, independent drive means can be provided or alternatively these elements can be coupled to one or other of the drive or driven rollers of the belts 21, 22.

As can be seen in FIG. 6 of the drawings, at least the lowermost stretch of the belt 21 is provided with a shaped backing plate 62 mounted in the box 34.

In operation, with the feed mechanism dipping into material 63 (such as, for example, grain in a ship's hold) and with the screw conveyor 45 and throwing wheel 47 rotated and the belts driven, material 63 is gathered up by the screw conveyor 45 onto its central located paddles 44 as seen in FIG. 4 of the drawings. The gathered material 63 delivered by the paddles 44 is scooped up by the paddle blades 48 of the rotating throwing wheel 47 and thrown upwardly and outwardly by this wheel 47, as seen in FIGS. 4 and 5, against the belt 21 which is thereby pressed against the backing plate 62, adopting the curvature of this plate 62, as clearly seen in FIG. 6 of the drawings. As a result of the upward and outward projection of the material 63 and the movement of the belt 21 the material is carried along by the belt and becomes enveloped by the opposite belt 22, the belts 21, 22 being pressed towards each other by the air pressure existing in the boxes 34 and 35. This air pressure ensures that the belts 21 and 22 firmly enclose the material 63 and that the adjacent longitudinal edge portions of the belts 21, 22 are pressed towards one another thereby preventing the outward spilling of the material 63.

In this way material 63 is constantly gathered by the screw conveyor 45 and thrown upwardly by the thrower wheel 47 into the feed zone 41 and on to the belt 21 whereupon it is enclosed and carried up the elevator column 1 emerging therefrom into the conveyor boom 3 and from there drops through the central column 4 into the transporting bridge 13.

It will be understood that the degree of deformation of the belt 21 depends on the quantity of material 63 projected against it by the thrower wheel 47. Thus this deformation can vary from zero (with no material) to the position shown in FIG. 6 of the drawings where the belt is forced against the backing plate 62.

The rate of material feed can be varied by varying the speed of the screw conveyor 45 and/or by varying the degrees of immersion of the feed mechanism 2 in the material 63. It is preferred however to control this rate of varying the speed of rotation since this obviates the necessity of constantly controlling the degree of immersion of the feeding mechanism in the material.

Furthermore, as previously indicated, over-immersion of the feed mechanism 2 in the material 63 is to be avoided and it is for this purpose that the pressure sensitive diaphragm 2a is provided which causes an alarm to be given when over-immersion occurs or even interrupts operation.

It should furthermore be noted that whilst in FIG. 4 of the drawings the screw conveyor 45 is shown as having only a single flight on either side, in practice multiple left and righthand flights would be employed so as on the one hand to ensure a smoother feeding into the central section and so as to prevent the entry of large foreign bodies into the section. The provision of the conveyor 45 with the centrally located paddles is optional and can be dispensed with.

FIG. 7 shows a slight modification of the thrower wheel 47 shown in the preceding drawings in that paddle blades 48a are provided which are curved giving the paddle blades 48a a scoop-like shape.

In FIGS. 8 and 9 there is shown a modified form of feed mechanism which is sealingly fitted around the feed zone 41 in a manner similar to that described above with respect to the preceding embodiment. In this embodiment the feed mechanism comprises a unitary collecting and throwing wheel 65 comprising a plurality of suitably shaped, substantially radially directed paddles 66 which are mounted and radiate from a central hub 67 mounted on a driven axle 68. The wheel 65 is mounted within a casing 69 which is sealingly secured around the feed zone 41 in a manner similar to that described above with respect to the preceding embodiment. The wheel 65 and its paddles 66 are so designed and are of such a capacity as to be capable on the one hand, of scooping up the material into which it has been lowered and, on the other hand, of throwing this material upwardly and outwardly into the feed zone 41 and onto the exposed surface of the upwardly ascending conveyor belt 21.

The shape, size and number of the individual paddles 66 are determined in accordance with the nature of the material being handled. As in the case of the preceding embodiment, the rate of material feed can be varied by varying the degree of immersion of the wheel 65 into the material or alternatively and preferably, by varying the speed of rotation of the wheel 65.

An alternative embodiment of feed mechanism is shown schematically in FIG. 10 of the drawings. In this embodiment the feed mechanism consists of a scraper conveyor 71 consisting essentially of a belt or chain 72 to which are secured scoop-like scraper blades 73, the belt 72 passing around a drive pulley 74 and a driven pulley 75. The scraper conveyor is associated with a casing 76 which is secured around the feed zone 41.

In use such a scraper conveyor 71 is effective in scraping and displacing the material to be conveyed until it reaches the lefthand end of the conveyor, i.e. passes over the pulley 74 at which stage the material is projected upwardly and outwardly in the manner described above in respect of the thrower wheels. Thus, in effect the pulley 74 and the belt or chain and blades passing thereover constitute an effective thrower wheel as described above. Such a scraper conveyor 71 is particularly effective in respect of material which is not free flowing and ensures the displacement of this material to the region of the elevator and its projection into the feed zone 41 thereof.

As previously explained the rate of feed can be varied as a function of the degree of immersion of the feed mechanism in the material or alternatively and preferably by varying the speed of drive of the scraper conveyor.

In FIG. 11 there is shown schematically a modified form of feed mechanism designed particularly for use in a stationary installation such as, for example, a silo, so as to replace a conventional elevator. In this mechanism a thrower wheel 77, substantially identical in construction with the thrower wheel illustrated in and described with reference to FIGS. 3–7 of the drawings is mounted in a casing 78, one end 79 of which is secured around a feed zone 41 whilst the opposite end 80 is designed to be coupled to a feed pipe (not shown) through which the material to be elevated is fed via an appropriate valve (not shown). In the case of this feed mechanism, the material reaching the thrower wheel 77 is thrown upwardly and outwardly into the feed zone 41 and against the exposed belt portion in a manner similar to that described above.

In the embodiment shown in FIG. 12 a feed mechanism substantially identical with that just described with reference to FIG. 11 is coupled to the outlet of a vertical screw conveyor 81 which, upon rotation by drive means (not shown) raises the material into which it dips and discharges it into the casing 78 wherein it is thrown upwardly and outwardly by the thrower wheel 77. It will be realised that the screw conveyor 81 can be replaced by some other mechanical elevating means such as, for example, a bucket elevator or a chain drag conveyor or the like. Alternatively, the feeder mechanism as described with reference to FIG. 11 can be associated with an essentially horizontal type conveyor arranged to discharge the material onto the thrower wheel 77.

FIG. 12a illustrates a modification of the embodiment shown in FIG. 5. In FIG. 12a elements of the elevator-conveyor and feeding mechanism identical with those seen in FIG. 5 are given the same reference numerals. As can be seen the thrower wheel of FIG. 5 has been dispensed with and on the other hand the belt 22 is now extended downwardly past the drum 33 so as to extend around a drum 31a disposed substantially on the same level as the drum 31 but offset with respect to the drum 33 so that the terminal portions of the belts 21 and 22 are spaced apart thereby defining an exposed belt region which effectively constitutes a wedge-shaped feed zone 41a which, as can be clearly seen, is bounded by substantially straight, terminal portions of the belts whose lengths are substantially greater than the maximum thickness of the feed zone thus formed. These terminal portions define a wedge angle which is not greater than that which allows for the entrainment of the material therein. Below this feed zone 41a there is located, as in the case of the embodiment shown in FIGS. 5 and 8, a feed mechanism including the centrally disposed set of substantially radiating extending paddles 44.

In operation the gathered material 63 is delivered by the paddles 44 directly (without any intermediate throwing wheel) into the feed zone 41a between the spaced apart terminal portions of the belts. In view of the shape and relative dimensions of the wedge shaped feed zone 41a, its length being substantially greater than its maximum thickness, the gathered material is bodily entrained in the feed zone and the material thus introduced into this wedge-shaped feed zone 41a is carried upwardly and upon reaching the region of the drum 33 is effectively enveloped by the belts which are now pressed towards each other with their edge portions in contact. The terminal belt portions adjoining the feed zone are provided with side seals (not shown) to prevent dispersal of the material prior to its being enveloped and carried away by the belts.

In the modification illustrated in FIG. 12b of the drawings a pair of counter rotating paddle wheels 44a and 44b replace the previous unitary wheel 44 and serve to raise and deposit the material in the feed zone.

In our earlier patent specification reference has been made to the possibility of constructing one or both of the belts in such a way that the central longitudinal portion is more yielding and can therefore bulge more readily than can the longitudinal edge portions and in this way to ensure that the belt or belts can be readily deformed along its longitudinal middle portion so as to conform to the size and shape of the material enclosed thereby and transported. It has now been appreciated that, in addition to their flexibility the mid-portions of at least one of the belts should also have a high degree of elasticity with respect to their edge portions so as to ensure that the belts, together with the material enclosed thereby, pass over the drums without the longitudinal edges separating and allowing the material to pour out. Thus, when the belts 21, 22 and enclosed material 63 pass over the uppermost drum 33 the longitudinal central section of one or both belts must be capable of stretching with respect to the longitudinal edge sections and then to return to the original dimensions thereof.

FIG. 13 shows a belt construction capable of fulfilling these requirements. As seen in the drawings a belt 85 formed of a suitable, resiliently flexible, rubber or plastics material is reinforced at its longitudinal edges with layers of embedded reinforcing plies 86 which can, for example, be made of polyester nylon. The central longitudinal portion of the belt is, in accordance with this example, strengthened by means of the provision of an embedded ply 87 of an elastic material such as, for example, polyester "stretch." As can be seen the ply 87 is arranged to overlap, at its longitudinal edges, the lowermost reinforcing ply 86.

The reinforced edge portions of the belt thus are provided with the required strength and are also provided with an increased rigidity vis-a-vis the longitudinal median portion.

The provision of the central elastic ply 87 is designed to impart to the belt, resistance to tear, in the event of mechanical damage to the belt. Thus, without such a reinforcement, the initiation of a tear in a rubber belt would rapidly result in the tear proceeding along the length of the belt. Where the belts are used under conditions where the chances of mechanical damage are minimal the provision of this central reinforcing ply can be dispensed with. Where, however, these conditions are not minimal the central reinforcing ply can, if required, be supplemented by one or more additional elastic plies. Similarly, the number of reinforcing edge plies which, in the examples specifically shown in the drawings is three can be varied in accordance with the requirements.

In one specific example a rubber belt having a width of 110 cms. was provided with reinforcing edge plies of between 15 and 20 cm. width, the overall thickness of the belt being about 6 mm.

Whilst the surface of the belt or belts in contact with the material to be conveyed can be smooth, difficulties may arise in the conveying of material which is either very fine and powdery or is covered by a powder-like coating or is otherwise difficult to grip. For these purposes the belt surface must have an increased gripping quality. In the embodiment shown in FIG. 13 the longitudinal central portion of the belt surface which is to be in contact with the material is pitted by means of successive rows of recesses 88. Such pitting enables the belt to grip the conveyed material with minimal slippage. On the other hand, material which has become lodged in the recesses 88 is effectively dislodged when the belt flexes while passing over the drums.

The pattern, shape and sizes of the recesses are chosen in accordance with the characteristic of the material to be gripped and conveyed. Under certain conditions these recesses can be replaced by projections which also impart to the belt the required gripping properties.

FIGS. 14–17a show various constructions of the longitudinal edge portions of the belt which facilitate the effective sealing of the juxtaposed belts against the egress of material or of the ingress of air.

Thus, in the embodiment shown in FIG. 14 the belt is provided, on an outer surface, with a longitudinally extending, flexible rib 89 which can be pressed downwardly agaisnt the belt surface.

In the embodiment shown in FIG. 15 the belt is provided with a longitudinally extending rib 90 similar to the rib illustrated in FIG. 14 with the region between the rib and the belt filled with a resilieht filler 91 so as to prevent the lodging of the material in this region.

Whilst the ribs 89 and 90 are shown as formed integrally, as one piece with the outer surface of the belts, the ribs can be formed as a separate piece of a hard wearing material such as, for example, polyurethane which can if necessary be replaced when worn.

In the embodiment shown in FIG. 16 of the drawings, one of the belts is provided, on an inner surface thereof, with a pair of longitudinally extending projecting ribs 92.

In the embodiment shown in FIG. 17 of the drawings one of the belts is provided on an inner surface thereof with a sealing bead 93 bonded to the belt in a longitudinal groove thereof.

It will be appreciated that the additional sealing means illustrated in FIGS. 14 to 17 of the drawings are to be found in both longitudinal edge portions of one or both of the belts. The specific purpose of the sealing means and the way in which they are employed will be described below with reference to FIGS. 26 and 27 of the drawings.

In an alternative construction shown in FIG. 17a and designed for use with a unitary box construction the juxtaposed edge portions of one of the belts are provided on the inner surface with grooves 93a which define together with the juxtaposed belt surface to form continuous channels running along the length of the juxtaposed edges. These channels are open to the atmosphere before entering and after leaving the air boxes whereby air, leaking into this channel from the unitary air box can be continuously bled away without reaching the enclosed contents of the belts.

In the earlier parent specification the need to provide an effective air seal between the edges of the separate air pressure boxes which respectively open out onto the belts, and the adjacent belt surfaces, was referred to. It is to be emphasized that this seal is required in order to prevent an unduly large leakage away of the air from the air boxes and not to ensure the effective sealing of the longitudinal edges of the belts so as to prevent egress of the material. This latter sealing is primarily effected as a result of the air pressure applied to the belts. Specific ways of providing this air seal will now be described.

In FIG. 18 there is shown a cross-sectional view through a pair of belts 21, 22 as they ascend upwardly through their respective air boxes 34 and 35. As can be seen, the belts 21, 22 envelope and enclose between their outwardly bulging, central, longitudinal portions material 63 which is to be conveyed. These central longitudinal portions are pressed towards one another and against the enclosed material whilst the juxtaposed longitudinal edge portions 21a, 21a, 21b, 22b are pressed against each other by the air pressure prevailing in the boxes. The boxes 34 and 35 are mechanically coupled to each other (thereby preventing their movement apart under the influence of the air pressure) by means of sets of struts 101a and 101b. Each set consists of spaced apart individual struts 101 which extend along the length of the boxes. Secured to the strut sets are respective pairs of oppositely directed, Z-shaped continuous brackets 102a, 103a, 102b, 10sb. At least the elongated central limbs of the brackets 102 are resiliently flexible. A first end limb of each bracket is secured to the adjacent strut and the opposite end limbs of the bracket have coupled thereto oppositely directed rollers 104a, 105a, 104b, 105b and curved stainless steel strips 106a, 107a, 106b, 107b. The justaposed, pressed together longitudinal belt edge portions 21a, 22a pass between the strips 106a, 107a and rollers 104a, 105a into the enclosure defined by the brackets 102a, 103a and struts 101a, this enclosure being open to the atmosphere via the spacings (not shown) between the struts 101a. Similarly the juxtaposed, pressed together, longitudinal belt edge portions 21b, 22b pass between the strips 106b, 107b and rollers 104b, 105b into the enclosure defined by the struts 101b and brackets 102b, 103b, this enclosure also being open to the atmosphere via the spacings (not shown) between the struts 101b.

The rollers 104, 105 are so mounted and dimensioned as to bear lightly against the belt edge portions. On the other hand the strips 106 and 107 are so mounted and dimensioned as to be slightly spaced away from these edge portions. In practice a spacing of between 0.2–0.5 mm is adopted.

By virtue of the mounting of the rollers 104, 105 on the relatively flexible brackets 102, 103, the rollers 104, 105 can readily follow any variation in thickness between the juxtaposed edge portions 21a, 22a, 21b, 22b arising for example as a result of the interposition of material between these edge portions. On the other hand, and also as a result of this relatively resilient mounting, and the fact that extended surfaces of the brackets 102, 103 are exposed to the superatmospheric pressure prevailing in the boxes, the brackets 102, 103 and, in consequence, the rollers 104, 105 are pressed downwardly into firm engagement with the longitudinal edge portions of the belts 21, 22.

It will be readily seen that, under normal circumstances, the belts 21, 22 are effectively in contact only with the rollers 104, 105 and that under most circumstances and operating conditions there is no significant contact with the strips 106, 107. As a consequence the only frictional forces exerted on the belts by this sealing system are the rolling frictional forces of the rollers 104, 105 as they are pressed onto the belts 21, 22 and are rotated by the movement of the belts 21, 22. As is well known such rolling frictional forces are relatively negligible and do not contribute to any significant wear of the belts. On the other hand the sealing strips 106, 107, whose function is to prevent any significant air loss from the air boxes 34, 35 hardly come into contact with the belts 21, 22 at all and therefore their contribution to the frictional wear of the belts is practically zero.

It will be realised that the degree of air loss from the boxes 34, 35 depends, of course, on the spacing of the sealing strips 106, 107 from the belt edge portions and the arrangement just described whereby the rollers are forced by the air pressure into close contact with the belts carries with it the necessary consequence that the sealing strips are also located quite close to the belts. As long, however, as these sealing strips 106, 107 are not in permanent contact with the belts they do not contribute significantly to any frictional wear whilst on the other hand they are spaced sufficiently close to prevent significant air loss.

It will be appreciated that the sealing system just described allows for a small air loss between the sealing strips 106, 107 and the belts and this small air loss can readily be made good by the compressed air supply with which the system is provided.

It will furthermore be realised that, as seen in FIG. 19 of the drawings, the rollers 104, 105, being spaced apart cannot themselves ensure the effective sealing of the air boxes with respect to the belts or in fact the effective sealing of the belts themselves against the egress of material. It is for this reason that the additional provision of the sealing strips 106, 107 is essential. The sealing of the belts 21, 22 themselves against egress of material is as a consequence of the air pressure acting on the belts 21, 22.

With the sealing arrangement just described it has been assumed that the belts 21, 22 in the elevator column always occupy a substantially vertical central position. This is however not always the case and when the elevator column is displaced from the vertical this displacement could result in the belts 21, 22 resting on one or other of the sealing strip pairs 106, 107 which of course increases the frictional wear and also results in the distortion of the brackets 102, 103. In order to cope with this situation the elevator column 1 is provided, as seen in FIG. 20 of the drawings, with longitudinally extending, stainless steel backing plates or strips 111 secured to a rigid framework 112 which, in its turn, is secured to the back walls of the boxes 34, 35. It will be readily seen from this drawing (which also shows the return flights of the belts 21, 22) that, upon the tilting of the elevator column 1 from the vertical, the belts 21, 22 pass over and are in contact with the backing plates 111 with minimal frictional resistance to movement and therefore do not exert any unduly large force on the mounting brackets and sealing strips. The shape, size and disposition of the backing plates 111 are such as to correspond to the maximum cross-sectional area through the belts when fully loaded. This area is in practice greater than that corresponding to the nominal capacity of the belts. The low friction backing plates or strips can be replaced by low friction backing rollers. It is to be noted with respect to the embodiments described with reference to FIGS. 18, 19 and 20 of the drawings that, in all cases, the sealing strip and backing plate surfaces exposed to the belts are rounded so as to present minimal resistance to motion, afford minimal possibility of tear of the belts by conact therewith and also so as to allow for the ready re-entry of the belt edge portions into the sealing system if for any reason they may have been withdrawn.

It will be appreciated however that the provision of these backing plates is only indicated where the elevator is as shown in FIG. 1 of the drawings designed for use in varying positions. Where, however, the elevator is a static elevator, i.e. to be used purely in the vertical position these plates need not be provided.

It will be appreciated that with the sealing arrangement just described with the sealing strips slightly spaced from the belt edges a small loss of air from the air boxes occurs. Whilst this may be tolerated from the point of view of power loss there are circumstances where this constant air flow may be objectionable seeing that, it can give rise to dust clouds. Where this occurs and is objectionable, means have to be provided for effecting a more complete sealing against such air loss. Furthermore whilst in the arrangement just described the sealing strips are kept in position by means of rollers, under certain operating conditions for example when the elevator-conveyor is used with wet or corrosive materials the use of rollers may not be desirable. It is with a view to providing a seal which meets these requirements or avoids these disadvantages that the sealing systems now to be described with reference to FIGS. 21 to 30 of the drawings have been developed.

Referring to FIGS. 21 and 22 of the drawings there is here shown a belt and air box arrangement which is essentially similar to that shown with reference to FIG. 18. In this case the air boxes 34, 35 are, as before mechanically coupled to each other by means of spaced-apart struts 115. Rigidly coupled to each set of struts is a pair of oppositely directed brackets 116 having outwardly flared end portions 117. In this embodiment as distinct from that described with reference to FIG. 18 of the drawings, the brackets 116 are of rigid construction and so are not deformable by air pressure. Mounted to and within each pair of brackets 116 is a pair of flexible mounting strips 118 to the free ends of which are secured outwardly directed stainless steel sealing strips 119. As seen in FIG. 21 of the drawings the juxtaposed edges of the belts 21, 22 pass through the flared bracket edges 117 and between the outwardly directed sealing strips 119. The bracket edges 117 are spaced apart sufficiently to allow for the passage therethrough of the belt edges without effectively sealing these edges 117 with respect to the air boxes 34, 35. In consequence the flexible mounting strips 118 and sealing strips 119 are subjected to the superatmospheric air pressure prevailing in the air boxes and this air pressure combines with the normal spring pressure exerted on the sealing strips 119 so as to press the sealing strips 119 into sealing engagement with the belt edges.

It is clear that the continuous contact of the sealing strips 119 with the belt edges reduces the air loss from the air boxes to a minimum. On the other hand, the flexible mounting strips 118 and sealing strips 119 present an area to the superatmospheric pressure which is substantially less than that presented by the rigid brackets 116 (comparable to that of the flexible brackets 102, 103 in the previous embodiment) and in consequence the pressure with which the sealing strips 119 are pressed against the belt edge portions by the action of the superatmospheric air pressure is kept relatively low thereby reducing to a minimum frictional wear as a consequence of this continuous contact between the belt edge portions and the sealing strips.

It will furthermore be seen that, whilst the sealing strips 119 are effective in preventing any significant air loss from the air boxes 34, 35 the belt edge portions themselves are, even prior to entry into the sealing zone effectively held together by the air pressure prevailing in the boxes 34, 35. In consequence the sealing strips 119 do not have to act on the belt edge portions with any substantial pressure and, in this way, the frictional wear is kept low.

On the other hand the sealing strips 119 should be as flexible as possible so as to accommodate variations in the thickness of the belts. At the same time the strips 119 should be bent outwardly so as to allow for the ready return of the belts into the sealing position if, for any reason, they have become removed. For this purpose the sealing strip 119 can be formed as shown in FIG. 22 of the drawings with the outwardly tapered portion 119a, slotted.

FIGS. 23 to 25 show alternative sealing systems wherein the sealing strips 119 as shown in FIG. 21 are replaced by other sealing means.

In all cases the sealing means are associated with relatively rigid brackets of the kind shown in FIG. 21 of the drawings and which are not displaceable under air pressure. In the embodiment shown in FIG. 23 support brackets 121, secured to struts 115 have grooves 122 formed on the inner surfaces in which are located resilient tubular profiles 123 which bear against the interposed belt edge portions. These tubular profiles 123 can be connected to an air pressure source (not shown) which can be the same source used for pressurizing the boxes. Alternatively the tubular profiles 123 can be filled with a resilient material such as, for example, polyurethane foam or the like. In order to reduce the frictional resistance to movement between the tubular profiles 123 and the belt edge portions and thereby to reduce the frictional wear on the belt edge portions and on the tubular profile the embodiment shown in FIG. 24 can be adopted in which the tubular profiles 123 are covered, in the regions opposite the belt edge portions with stainless steel strips 124.

As in the previous embodiments the rigid brackets have flared mouth portions into which the belt edge portions project thereby serving to locate the belt edge portions in sealing position and so as to facilitate their return if they have been removed for any reason.

In an alternative embodiment shown in FIG. 25 of the drawings the rigid brackets 121 are again grooved but in this case the grooved portion 122 is provided with one or more apertures 125 and is covered with a resilient strip 126 of rubber or the like which, in its turn, has mounted thereon, a stainless steel strip 127 which contacts the belt edges. There is thus created a pressure zone 128 defined by the bracket groove 122 and the rubber strip 126 which is in communication with the air box or which can, alternatively be connected to an alternative pressure source and, as a consequence, the rubber strip 126 and the stainless steel strip 127 mounted thereon is pressed into sealing engagement with the belt edge portions. In this way air boxes are effectively sealed with respect to the belt edges, with the seal accommodating itself to any variations in the thickness of the belt edge portions.

Figure 26:
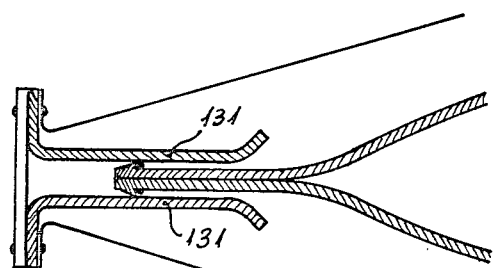
Figure 27:
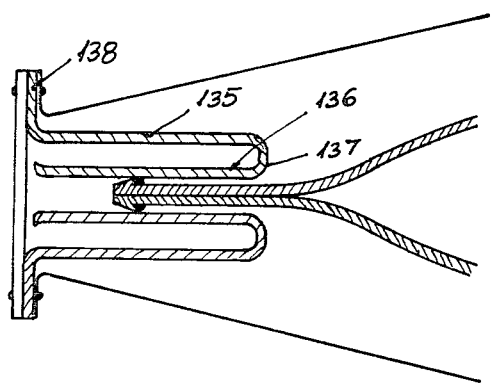

Alternative sealing arrangements are illustrated in FIGS. 26 and 27 of the drawings. With these arrangements, belts as constructed in FIGS. 14 and 15 are shown as being employed.

In the embodiment shown in FIG. 26 there are secured to the struts 115, serving to couple the two air boxes together, a pair of longitudinally extending rigid brackets 131 which face each other and which flare outwardly at their ends remote from the coupling struts 115. The brackets 131 are suitably made of stainless steel or other low-friction material. The juxtaposed edge portions of the belts, as shown in FIGS. 14 or 15 of the drawings are inserted into the region between the brackets 131 and, as a consequence the ribs 89 or 90 press downwardly towards the adjacent belt surfaces sealing the respective air boxes with respect to the belt edge portions. The entire width of the belt edge portions located between the brackets 131 are exposed to the superatmospheric pressure of the boxes which is therefore effective in keeping these edge portions pressed together. This in contrast with the sealing arrangements previously described wherein a significant width of the edge portions were not exposed to the superatmospheric pressure.

In an alternative arrangement shown in FIG. 27 of the drawings the brackets 131 as seen in FIG. 26 are replaced by brackets 135 which have been bent over on each other so as to form arm pairs 135 and 136 each pair having arms parallel to each other and coupled together by a common rounded portion 137. The arm 135 is coupled to the strut by means of a flange 138. With this alternative arrangement, whilst the brackets 135 are essentially rigid and can therefore not flex under air pressure, the increased length of the arm pairs 135, 136 allow for greater relative flexibility and thus, should relatively incompressible material be located between the belt edge portions the arms 136 can flex apart so as to allow the belts carrying this material to pass.

An added advantage of the sealing arrangement structure shown in FIGS. 26 and 27 resides in the extended surface of the brackets 131 in the one case and arm 136 in the other case. Thus sealing is effected irrespective of where this surface contacts the ribs and therefore the belt edges can be significantly displaced in a direction towards and away from the flared mouth portion without interfering with the sealing.

In FIGS. 28 to 30 of the drawings there is shown a belt and air box arrangement which is essentially similar to that shown with reference to FIG. 18 with air boxes 34 and 35 mechanically coupled together by means of spaced apart struts 115. Rigidly coupled to each set of struts is a pair of substantially rigid support brackets 161 which are substantially not deformable under air pressure. Located within each pair of brackets 161 is a pair of stainless steel sealing strips 162a, 162b. The justaposed edges of the belts 21, 22 are respectively sandwiched between the sealing strip pairs 162a, 162b. Each lowermost sealing strip 162b is rigidly mounted on the lowermost bracket 161 via an interposed longitudinally extending mounting block 163. An elongated flexible seal 164 formed of plastic, rubber or the like and being of substantially semi-circular cross-sectional shape is sealingly secured to opposite longitudinal edge portions of the upper bracket 161 and upper sealing strip 162a. An elongated spring steel biassing strip 164 is mounted, cantilever style at one longitudinal edge thereof on a mounting strip 165 which is itself mounted on the underside of the upper bracket 161, the opposite longitudinal edge portion of the biassing strip 164 bearing biassingly on the upper sealing strip 162a. In this way the upper sealing strip is flexibly biassed against belt edges which are themselves therefore pressed sealingly against the lower sealing strip 162b.

As can be seen clearly in FIG. 30 of the drawings the upper sealing strip 162a is formed of a successive series of aligned component sealing strips, each component sealing strip being hinge mounted at its respective extremities to the mounting strip 165 via a hinge 166 mounted on the component sealing strip and in its turn secured to a mounting flange 167 (which can suitably be formed of spring steel) which in turn is secured to the mounting strip 165.

The inwardly directed longitudinal edges of the sealing strip pairs 162a, 162b are formed with outwardly flaring projections 168 which serve to guide the belt edges back into position should they, for any reason be displaced out of position and also serve to facilitate the introduction of replacement belts.

The construction just described provides for an effective seal between the moving belts and the stationary sealing strips without introducing any undue frictional wear between the sealing strips and the belts. This is achieved in view of the fact that the upper sealing strip 162a is biassed against the belt edge merely by the relatively moderate biassing force exerted by the biassing strip 164, neither the latter nor the sealing strip 162a itself being exposed to pressures obtaining in the air box 34. The fact that the flexible seal 164 is of substantially semicircular cross-sectional shape ensures that it too does not exert any significant biassing effect on the sealing strip 162a as a consequence of the action of air pressure. It will be realised that the lower sealing strip 162b being firmly mounted on the rigid mounting block 163 is not effectively distorted by air pressure so as to exert an untoward biassing effect on the belt edge. It will be understood however that in certain circumstances both sealing strips 162a and 162b can be flexibly and resiliently mounted.

Whilst in the embodiments specifically described above reference has always been made to the passage of the belts in communication with a pair of air boxes each of which is connected to a source of air pressure it will be understood that, as suggested in the earlier patent, the invention is equally applicable to the case where the belts are passed through a unitary air box, air pressure being exerted on opposite sides of the belt by the pressure prevailing in the unitary box. In this case the necessity to avoid air leakage from the separate boxes with respect to the separate belts is obviated. On the other hand means must be provided for ensuring that the juxtaposed longitudinal edges of the belts remain sufficiently pressed together by the prevailing air pressure so as to obviate the possibility of inward leakage of the compressed air.

The belt constructions illustrated in FIGS. 16 and 17 of the drawings are particularly designed for use where the bulk material is very fine and it is required to ensure that substantially none escape during the movement of the belts through the boxes. For this purpose one of the belts is provided on an inner surface thereof and in the longitudinal edge portions thereof with the longitudinal ribs 92 and 93. These ribs are pressed against the juxtaposed belt surface by any of the mechanical means previously described and/or the effect of the superatmospheric air pressure acting on the outer belt surfaces and in this way the enclosed material is effectively sealed against egress.

Where, however, the belts are arranged to pass through a unitary air box the arrangement just described is also effective in preventing the ingress of air between the belts.

Reference will now be made to FIGS. 31 to 35 of the drawings for a description of the means employed so as to ensure an effective seal against substantial air losses from the upper and lower ends of the air boxes with respect to the belts.

It is to be understood that with regard to the sealing, which is to be effected between a moving belt or belt drum on the one hand and the stationary box structure on the other hand, two differing problems arise. A first sealing problem arises where the moving component (i.e. the belt or the drum) is of constant non-variant shape. In this case a simple flexible seal such as, for example, the flexible (e.g. rubber) strips 37, 38, 40 can be used so as to seal off the box with respect to the moving component. A second and different problem arises where the moving component is of variable shape and here a variable seal must be provided whose sealing properties are self-adjusting in accordance with the shape of the moving object. It will be at once realised that, in the present case the varying shape with respect to which the box structure is to be sealed is constituted by the belt when deformed by the enclosed material. In the embodiment just described and now to be described with reference to FIGS. 31 to 35 of the drawings only one of the belts (21) is so deformed, the other belt 22 passing over the cylindrical drums 32, 33 remaining substantially flat. It will be realised however that the seals now to be described are also applicable where both belts 21 and 22 are deformed by the enclosed material suitable provision being made to allow for the deformation of the second belt 22 by suitably shaping the drum 33.

In the embodiment now to be described with reference to FIGS. 31 to 35 of the drawings, reference will only be made to the sealing of the upper end of the air boxes via-a-vis the belts and the drums, details of the sealing of the lower ends of the boxes with respect to the belts and the drums having been described with reference to FIGS. 2, 3 and 5 of the drawings.

As seen in FIGS. 31 to 35 of the drawings each of the boxes 34 and 35 is formed of a substantially channel-shaped structure. Thus the box 34 consists of an end wall 141 and side walls 142, the longitudinal edges of the side walls 142 being sealed with respect to the longitudinal edge portions of the belts by the sealing arrangements previously described with reference to FIGS. 18 to 27 of the drawings. As can be seen clearly in FIGS. 2, 3 and 5 of the drawings, the lowermost edges of the box 34 are provided with flexible strips 37 which are arranged to press tightly against the exposed surface of the drum 31.

The box 35 is similarly formed of a side wall 143 and end walls 144 and is similarly provided with longitudinal sealing means and transverse sealing strips 38. The upper end of the box 35 is provided with sealing strips 40 running respectively along the edge of the end wall and the edges of the side walls, these strips 40 being pressed against the exposed surface of the drum 33.

As has been previously indicated the sealing of the upper end of the box 34 via-a-vis the belt 21 presents a particular problem seeing that the belt 21, in the present embodiment is deformed when it encloses the material and this deformation can be to a varying extent so that the ultimate shape of the belt 21 can vary from a completely flat shape as seen in FIGS. 31 and 32 of the drawings, to a deformed shape as seen in FIGS. 33 and 34 of the drawings.

It is for this purpose that the upper seal 36 is provided. The seal 36 is constituted by a flexibly resilient diaphragm 146 of substantially rectangular shape and formed of rubber or other such flexibly resilient material. The diaphragm 146 is sealingly coupled at its transverse edge 147 to the corresponding edge of the end wall 141 of the box 34. The side edges of the diaphragm 146 are similarly sealingly coupled to the edges of the side walls 142 of the box 34.

A series of elongated, flexible, stainless steel strips 148 are secured at their lowermost ends by rivets 148a to the end wall 141 of the box 34 and, at intermediate positions thereof by rivets 150 to the transverse edge of the diaphragm 146 remote from the edge 147. Thus the steel strips 148 bear against the surface of the belts 21 and, by virtue of the provision of the flexible diaphragm 146, the steel strip surfaces bearing against the belt 21 can readily accommodate themselves to any deformation of the belt 21. It will be readily seen from the drawings than when the box 34 is under air pressure this pressure tends to inflate the diaphragm 146 and, as a consequence, the steel strips 148 are pressed against the surface of the belt 21. The spacing of the steel strips 148 is such that whilst on the one hand they are sufficiently spaced apart for the steel strips to adjust themselves in position with regard to the shape of the belt on the other hand the spacing is sufficiently small for the air loss between the strips 148 from the box 34 to be of little or no significance.

FIGS. 33 and 34 show how the steel strips 148 bear against the deformed belt 21 thereby effectively sealing the upper end of the box 34 against any significant air loss.

The strips may be made of any low-friction material having good spring quality such as, for example, stainless steel and should be of a thin cross-section. In a specific embodiment used in practice, stainless steel strips 2 mm thickness were employed. The shape of the diaphragm and the spacing apart of the steel strips is such as to allow the strips to deflect and constantly to maintain effective contact with the belt. Furthermore the shape of the diaphragm ensures that the pressure with which the steel strips act on the belt (and in consequence the frictional wear resulting from this pressure) is kept to a minimum. Thus the diaphragm tends to expand upwardly and in turn the steel strips are given an upwardly directed force component and this of necessity reduces the pressure with which the strips are pressed against the belt. With a substantial number of strips, in the particular example being considered, 28 strips were used, the amount of air escaping between the strips is insignificant.

Whilst in the arrangement just described the diaphragm 146 is inflated under the air pressure prevailing in the box 34 an alternative and possibly independent source of air pressure may be utilized for this purpose.

It is to be appreciated that the specific construction of the elevator-conveyor just described by way of example wherein the feed zone is adjacent an exposed belt portion upstream of the lowermost drum 31 ensures that the deformation of the belt 21 giving rise to its variable shape only takes place after it has passed the drum 23. In consequence the lowermost sealing of the belts 21 and 22 with respect to the drums 31 and 32 in the lowermost portion of the boxes are by means of simple flexible strips. This is of course a considerable simplification as compared e.g. with the construction as shown in the earlier patent whereby the already distorted belt or belts both leave and enter the air boxes and, under such circumstances a seal 36 of the kind just described with reference to FIGS. 31 to 35 of the drawings would have to be employed also in the lower regions of the boxes.

I claim:

1. In an elevator-conveyor for conveying bulk material over a predetermined path, at least a portion of which path is in a vertical or near vertical direction and comprising a pair of juxtaposed belts between which the bulk material is to be located and air pressure means adapted to act directly on one or both of the outer belt surfaces when the belts are in the vertical or near vertical direction so that the belts are pressed towards one another and against the interposed bulk material so as to enclose the same and so that the juxtaposed longitudinal edge portions of the belts are pressed against each other, the improvement wherein a terminal portion of the elevator-conveyor designed to be located in the vertical or near vertical direction comprising a pair of spaced apart lower drums at the lower end of the conveyor and over which the juxtaposed belts pass, and an upper drum engaged with one of the belts, the relative position of the drums causing the belts to form oppositely facing substantially straight terminal portions of said belts which are disposed at an acute angle with respect to each other and define therebetween a substantially wedge shaped feed zone, said angle not being greater than that which allows entrainment of the material therein, said zone opening outwardly from a position where the belts are substantially in contact towards a feed end of the conveyor where the belts define a maximum thickness of the feed zone, said straight terminal portions having lengths substantially greater than the maximum thickness of said feed zone, and a feed mechanism for gathering and projecting said bulk material into said feed zone.

2. The improvement of claim 1 wherein said feed mechanism comprises a thrower wheel formed with substantially radially directed paddles onto which the gathered material is displaced, a drive axle of said wheel arranged to be located in a substantially horizontal direction, rotation of said thrower wheel resulting in the projection of the gathered material into the feed zone.

3. The improvement of claim 2 wherein a pair of said thrower wheels are provided and are arranged to counter-rotate with respect to each other.

4. The improvement of claim 2, including a screw conveyor arranged to be disposed in the material in a substantially horizontal direction and adjacent to said thrower wheel, so that material is gathered by said screw conveyor and conveyed to said thrower wheel.

5. The improvement of claim 4 wherein said screw conveyor is formed with respective left-hand and right-hand screw flights on either side of a central portion disposed adjacent said thrower wheel so that material gathering in said central portion is transferred to successive paddles of said wheel.

6. In an elevator-conveyor for conveying bulk material over a predetermined path, at least a portion of which path is in a vertical or near vertical direction and comprising a pair of juxtaposed belts between which the bulk material is to be located and air pressure means adapted to act directly on one or both of the outer belt surfaces when the belts are in the vertical or near vertical direction so that the belts are pressed towards one another and against the interposed bulk material so as to enclose the same and so that the juxtaposed longitudinal edge portions of the belts are pressed against each other, the improvement wherein a terminal portion of the elevator-conveyor designed to be located in the vertical or near vertical direction and comprising terminal portions of said belts, adjacent inner surfaces of said terminal portions of the belts being disposed at an acute angle with respect to each other so as to enclose a substantially wedge-shaped feed zone tapering outwardly towards an end of the conveyor and a feed mechanism for gathering and projecting said bulk material into said feed zone, the improvement further comprising a thrower wheel formed with substantially radially directed paddles onto which the gathered material is displaced, a drive axle of said wheel arranged to be located in a substantially horizontal direction, rotation of said thrower wheel resulting in the projection of the gathered material into the feed zone, and wherein a vertical screw conveyor is associated with an input end of a feed chute is associated with said thrower wheel.

* * * * *